United States Patent
Ganapavarapu et al.

(10) Patent No.: US 11,694,110 B2
(45) Date of Patent: Jul. 4, 2023

(54) AGGREGATED MACHINE LEARNING VERIFICATION FOR DATABASE

(71) Applicant: International Business Machines Corporation, Armonk, NY (US)

(72) Inventors: Venkata Sitaramagiridharganesh Ganapavarapu, Peekskill, NY (US); Kanthi Sarpatwar, Elmsford, NY (US); Karthikeyan Shanmugam, Elmsford, NY (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 16/438,495

(22) Filed: Jun. 12, 2019

(65) Prior Publication Data

US 2020/0394552 A1 Dec. 17, 2020

(51) Int. Cl.
  *G06N 20/00* (2019.01)
  *G06N 7/01* (2023.01)
  *H04L 67/1097* (2022.01)

(52) U.S. Cl.
  CPC ............ *G06N 20/00* (2019.01); *G06N 7/01* (2023.01); *H04L 67/1097* (2013.01)

(58) Field of Classification Search
  CPC ........ G06N 20/00; G06N 20/10; G06N 20/20; G06N 7/005; G06N 7/00; G06N 5/00; G06N 5/02; G06N 5/022; G06N 5/04; G06N 3/02; G06N 3/00
  See application file for complete search history.

(56) References Cited

U.S. PATENT DOCUMENTS

| 10,171,992 | B1 | 1/2019 | Viswanathan et al. |
| 10,365,922 | B1 | 7/2019 | Wang et al. |
| 11,216,813 | B1 | 1/2022 | Delong et al. |
| 2015/0324690 | A1 | 11/2015 | Chilimbi et al. |

(Continued)

FOREIGN PATENT DOCUMENTS

| WO | 2018057302 A1 | 3/2018 |
| WO | 2020210979 A1 | 10/2020 |

OTHER PUBLICATIONS

Chen et al. "When Machine Learning Meets Blockchain: A Decentralized, Privacy-preserving and Secure Design", Dec. 2018, https://ieeexplore.ieee.org/abstract/document/8622598 (Year: 2018).*

(Continued)

*Primary Examiner* — Kamran Afshar
*Assistant Examiner* — Shoun J Abraham

(57) ABSTRACT

An example operation may include one or more of generating, by a plurality of training participant clients, gradient calculations for machine learning model training, each of the training participant clients comprising a training dataset, converting, by a training aggregator coupled to the plurality of training participant clients, the gradient calculations to a plurality of transaction proposals, receiving, by one or more endorser nodes or peers of a blockchain network, the plurality of transaction proposals, executing, by each of the endorser nodes or peers, a verify gradient smart contract, and providing endorsements corresponding to the plurality of transaction proposals to the training aggregator.

20 Claims, 23 Drawing Sheets

(56) References Cited

U.S. PATENT DOCUMENTS

| | | | |
|---|---|---|---|
| 2016/0125316 A1 | 5/2016 | Kadav et al. | |
| 2019/0012595 A1 | 1/2019 | Beser et al. | |
| 2019/0050727 A1 | 2/2019 | Anderson et al. | |
| 2019/0188787 A1* | 6/2019 | Besanson Tuma | ... H04L 9/0637 |
| 2019/0228006 A1* | 7/2019 | Tormasov | ............ H04L 9/3239 |
| 2019/0279107 A1 | 9/2019 | Wang et al. | |
| 2019/0332955 A1 | 10/2019 | Manamohan et al. | |
| 2020/0076884 A1* | 3/2020 | Li | ......................... H04L 67/108 |
| 2020/0082302 A1 | 3/2020 | Zoldi et al. | |
| 2020/0143267 A1 | 5/2020 | Gidney | |
| 2020/0218940 A1 | 7/2020 | Anglin et al. | |
| 2020/0272945 A1* | 8/2020 | Manamohan | ......... H04L 9/3239 |
| 2020/0364705 A1* | 11/2020 | Yadav | ..................... H04L 9/088 |
| 2021/0272017 A1 | 9/2021 | Singla et al. | |

OTHER PUBLICATIONS

Shae et al. "Transform Blockchain into Distributed Parallel Computing Architecture for Precision Medicine", 2018 https://ieeexplore.ieee.org/abstract/document/8416392 (Year: 2018).*

Xie et al. "Zeno: Distributed Stochastic Gradient Descent with Suspicion-based Fault-tolerance", Jun. 2019 http://proceedings.mlr.press/v97/xie19b/xie19b.pdf (Year: 2019).*

Androulaki et al., "Hyperledger fabric: A distributed operating system for permissioned blockchains," Proceedings of the 13th EuroSys Conference, ser. EuroSys '18, Apr. 2018, pp. 30:1-30:15.

Ferris et al., "OpenMalaria and EMOD: A case study on model alignment," Proceedings of the Conference on Summer Computer Simulation, pp. 1-9, 2015.

Shae et al., "Transform Blockchain into Distributed Parallel Computing Architecture for Precision Medicine," 2018 IEEE 38th International Conference on Distributed Computing Systems (ICDCS), Vienna, 2018, pp. 1290-1299.

Tesfay et al., "AVAIL: Assured Volt-Ampère Information Ledger," 2018 IEEE International Conference on Communications, Control, and Computing Technologies for Smart Grids (SmartGridComm), pp. 1-6. IEEE, 2018.

Zhang, "Poseidon: A system architecture for efficient gpu-based deep learning on multiple machines." arXiv preprint arXiv:1512.06216 (2015).

List of IBM Patents or Patent Applications Treated as Related, Jun. 16, 2019.

Venkata Sitaramagiridharganesh Ganapavarapu et al., "Efficient Verification of Maching Learning Applications", U.S. Appl. No. 16/438,476, filed Jun. 12, 2019.

Venkata Sitaramagiridharganesh Ganapavarapu et al., "Efficient Database Maching Learning Verification", U.S. Appl. No. 16/438,500, filed Jun. 12, 2019.

Baldominos et al., "Coin.AI: A Proof-of-Useful-Work Scheme for Blockchain-based Distributed Deep Learning", Mar. 23, 2019, arXiv, v1903.09800v1, pp. 1-8 (Year: 2019).

Kim et al., "Blockchained On-Device Federated Learning", Jun. 10, 2019, IEEE Communications Letters, vol. 24, No. 6 (Jun. 2020), pp. 1279-1283, published online Jun. 10, 2019 at https://ieeexplore.ieee.org/abstract/document/8733825 (Year: 2019).

Leventhal et al., "Randomized Hessian estimation and directional search", 2011, Optimization, vol. 60, pp. 329-345 (Year: 2011).

Xie et al., "Zeno: Distributed Stochastic Gradient Descent with Suspicion-based Fault-tolerance", May 18, 2019, arXiv, v1805.10032v3, pp. 1-17 (Year: 2019).

Yang et al., "ACM Transactions on Intelligent Systems and Technology", Mar. 2019, vol. 10 iss 2, pp. 1-19 (Year: 2019).

Zhu et al., "Blockchain-Based Privacy Preserving Deep Learning", 2018, Inscrypt 2018: Information Security and Cryptology, vol. 2018, pp. 370-383 (Year: 2018).

\* cited by examiner

AGGREGATED MACHINE LEARNING VERIFICATION FOR DATABASE

TECHNICAL FIELD

This application generally relates to consensus processes for machine learning applications, and more particularly, to aggregated machine learning verification for databases.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. As such, what is needed is a solution that overcomes these drawbacks and limitations.

SUMMARY

One example embodiment provides a system that includes a training participant network, comprising a plurality of training participant clients, each comprising a training dataset and configured to perform one or more of generate gradient calculations that each correspond to a training iteration for machine learning model training using stochastic gradient descent, the machine learning model training comprising a plurality of training iterations, and a training aggregator, coupled to each of the plurality of training participation clients, and configured to convert gradient calculations into a plurality of transaction proposals, a blockchain network, comprising one or more endorser nodes or peers, each comprising a verify gradient smart contract and configured to endorse the plurality of transaction proposals.

Another example embodiment provides a method that includes one or more of generating, by a plurality of training participant clients, gradient calculations for machine learning model training, each of the training participant clients comprising a training dataset, converting, by a training aggregator coupled to the plurality of training participant clients, the gradient calculations to a plurality of transaction proposals, receiving, by one or more endorser nodes or peers of a blockchain network, the plurality of transaction proposals, executing, by each of the endorser nodes or peers, a verify gradient smart contract, and providing endorsements corresponding to the plurality of transaction proposals to the training aggregator.

A further example embodiment provides a non-transitory computer readable medium comprising instructions, that when read by a processor, cause the processor to perform one or more of generating, by a plurality of training participant clients, gradient calculations for machine learning model training, each of the training participant clients comprising a training dataset, converting, by a training aggregator coupled to the plurality of training participant clients, the gradient calculations to a plurality of transaction proposals, receiving, by one or more endorser nodes or peers of a blockchain network, the plurality of transaction proposals, executing, by each of the endorser nodes or peers, a verify gradient smart contract, and providing endorsements corresponding to the plurality of transaction proposals to the training aggregator.

DETAILED DESCRIPTION

Figure 1A:
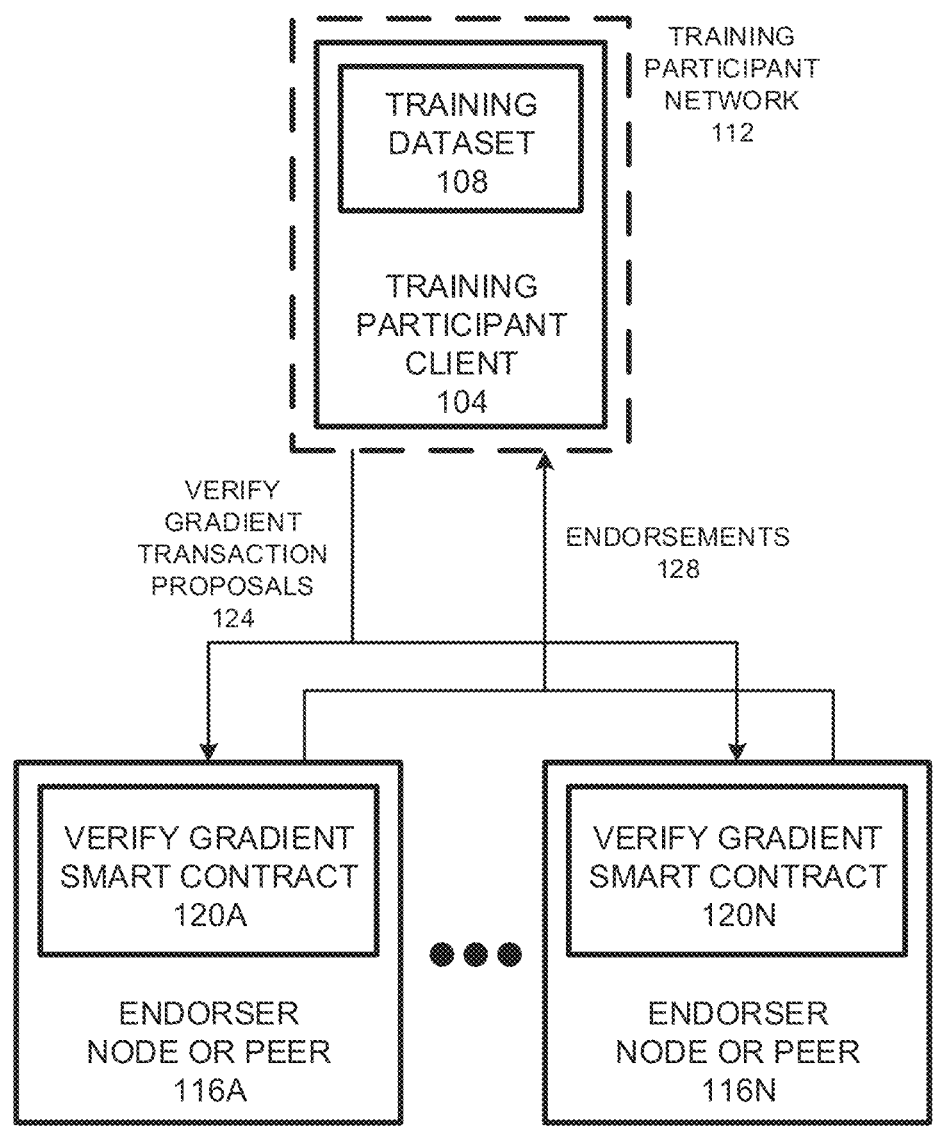
FIG. 1A illustrates a block diagram of verify gradient transaction endorsement in a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide aggregated machine learning verification for databases.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a shared ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The shared ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include the following. The disclosed protocols provide efficiently verifiable consensus mechanisms for the most popular algorithms in machine learning and artificial intelligence (stochastic gradient descent calculations and its variants). Verification of transaction proposals is several orders of magnitude faster (hours v/s seconds) than conventional verification, based on approximate and provable correct verifications instead of re-compute processes. The disclosed embodiments enable verifiability in different kinds of machine learning and artificial intelligence processes, including but not limited to popular machine learning training, optimization, deep neural networks, and support vector machines (SVMs). The disclosed embodiments also provide greater efficiency than conventional approaches and enable real-time auditability, by moving away from "post-process audit" through re-computation to real-time computation guarantees.

The present application enables efficient (real-time) verification of blockchain native machine learning and artificial intelligence processes. For example, training deep neural nets involves several gradient descent updates. The problem addressed by the present application relates to current blockchain consensus processes. Current blockchain consensus processes verify any computations via a "re-compute & compare" approach on each endorsing peer. In Hyperledger Fabric blockchain networks, the consensus mechanism involves multiple "endorsing peers" performing the same computation as the transaction submitting participant/peer and t comparing the results. The endorser nodes or peers arrive at the "consensus" if and only if a specified number of them agree on the results. If conventional blockchain processes were used, gradient computation would be performed as part of a smart contract on blockchain. Multiple endorsers would repeat the gradient computations for each iteration and compare & verify the results. This is a wasteful and highly inefficient approach. The current blockchain consensus processes are feasible only for simple and lightweight computations (e.g., simple financial operations). For complex computations, such as gradient computations in machine learning and artificial intelligence processes, what is needed is a significantly more efficient and computationally light approach.

The present application is about adding a capability to blockchain technology by enabling fast verification of machine learning training procedures. Although it can be used without a blockchain, the primary benefit of the disclosed verification protocols is intended to speed up machine learning training on a blockchain. One could potentially achieve a similar outcome if there is one fully trusted party that all other participants fully trust to run the database and if all verifiers are honest and can be trusted. This is not the case in many (or even most) practical settings.

The present application improves processing speed and resource consumption in blockchain networks, while training machine learning models on a blockchain. The novel protocol is designed to help blockchain applications to efficiently verify machine learning/artificial intelligence training updates. Sans the disclosed protocol, if machine learning training procedures are posted as smart contracts, they would trigger repetition of these procedures at the endorsers, thus delaying the consensus step. The disclosed embodiments provide novel and efficient verification mechanisms that do not repeat the training procedures. This verification mechanism may be posted as a smart contract on behalf of the machine learning training procedure.

The present application proposes a new type of smart contract that accompanies a machine learning training procedure. To this end, smart contract transactions will have relevant details about parts of training data and model updates. The improvement is precisely when an endorser verifies the training computation using this metadata. It does not need to perform the model training step again (which is a computationally expensive step). The disclosed embodiments describe a protocol that is an efficient verification step for endorser nodes or peers in blockchain networks.

FIG. 1A illustrates a block diagram of verify gradient transaction endorsement in a blockchain, according to example embodiments. Referring to FIG. 1A, the network 100 includes a training participation client 104. A training participant client 104 is a blockchain client that is responsible for training a machine learning model. Gradient computation is done by the training participant client 104 alone, since gradient computation by blockchain peers may be intractable due to limited computing resources on common blockchain peers. Efficient gradient computation may require advanced computing resources including graphics processing units (GPUs), which are more economically deployed in blockchain clients 104 that deal with the advanced calculations directly.

The training participation client 104 may be part of a training participant network 112 that includes other training participant clients 104. The training participation client 104 includes a training dataset 108. The blockchain network 100 may be either a public or permissioned blockchain network 100. However, the disclosed processes are primarily intended for permissioned blockchain networks 100.

Stochastic gradient descent is a standard optimization technique used in training machine learning models. This technique involves computation of the so called "gradients" of a particular loss function defined on the training dataset 108 and the type of model involved. In technical terms, a gradient is a representation of the best improvement that can be made to the model in a current iteration. In a typical machine learning training process, one starts from an initial model (intended for prediction) and updates the model step-by-step (i.e. iteratively), thereby guiding it in the direction of the best possible improvement per step. At the end of the process, one expects to find a model that works very well on the dataset 108 used to train the model. This stepwise update procedure is referred to as an iteration.

The disclosed processes provide efficiently verifiable consensus mechanisms and protocols for the most popular stochastic gradient descent protocols and variants. These processes provide several orders of magnitude faster computation (seconds vs. hours) based on approximate and provably correct verifications. They enable verifiability in different kinds of machine learning and artificial intelligence processes, (e.g., popular machine learning training, optimization, etc. including the deep neural networks and support vector machines (SVMs)). The disclosed processes also provide real-time auditability, thus moving away from "post-process audit" through re-computation to real-time computation guarantees.

In machine learning, during training, the model updating process may require a very expensive procedure that calculates the gradient. During test time, one just needs to do a prediction based on the current model. This prediction step is very fast. The disclosed novel methods use a few fast prediction steps to verify the gradient computation in a single training step.

In some embodiments, the training participation network 112 may include a trusted blockchain node or peer (not shown), which directly interfaces with blockchain nodes or peers providing endorsement, an ordering service, and block committers. The blockchain network 100 includes various endorser nodes or peers 116, each of which includes a verify gradient smart contract 120. There may be any number of endorser nodes or peers 116 in the blockchain network 100. FIG. 1A illustrates N endorser nodes or peers 116, from endorser node or peer 116A (including verify gradient smart contract 120A) through from endorser node or peer 116N (including verify gradient smart contract 120N).

The training participation client 104 performs gradient calculations on the training dataset 108, and the training participant network 112 provides the results in verify gradient transaction proposals 124 to the endorser nodes or peers 116. The endorser nodes or peers 116 execute the verify gradient smart contract 120 on the verify gradient transaction proposals 124. The verify gradient transaction proposals 124 that are approved are returned as endorsements 128 to the training participation network 112. Otherwise, the verify gradient transaction proposals 124 that fail are rejected. In a blockchain context, endorsers 116 usually verify the computations in smart contracts. However, the exact training procedure at the training participation client 104 cannot be included in a smart contract as it would trigger repetition of the computationally expensive training procedure, and thus causing significant delays within the blockchain network 100.

As an example, consider a single training participant client 104 with data D trains a model M using a stochastic gradient descent or related process. The goal is to ensure that the model is being properly trained by verifying gradients at each step or iteration. In a first step, the training participant client 104 accesses a batch B from D and computes the latest gradients $g_t$ on a loss function L, using previous model parameters $W_t$ and batch B. Data D and model parameters $W_t$ belong to the training participant client 104 who is responsible for training the model. These are stored outside the blockchain and only the verification-related attributes are stored on the blockchain. A typical step (iteration) in the training procedure takes the current model parameters $W_t$ and updates them using a small subset of samples from the training dataset 108. Subsequently, using some other subset of samples, further updates are made on the new model parameters. Any of these small subset of samples being used in a step is called a batch B. The previous model parameters $W_t$ are parameters of an output model of the previous training step or iteration.

The gradient computation may be stated as: $g_t = \Sigma(x \in B) \nabla L(W_t; x)$ The above parameters are described in more detail with respect to the verify gradient smart contract discussion with respect to FIG. 1C.

The weights computation may be stated as: $W_{t+1} = W_t - \eta g_t$, where $\eta$ is a scalar value that decides the step size (also called the learning rate in machine learning), which is how much the current model should be updated in the direction of the gradient.

The blockchain verification (API call) is Verify Gradient ($W_t$, $g_t$, B). In a second step, a new verify gradient transaction proposal 124 is submitted to the blockchain network 100, with previous model parameters $W_t$, gradient $g_t$, and the batch B. In a third step, one or more endorser nodes or peers 116 execute the verify gradient smart contract 120 in order to verify the correctness of the gradient computation by the training participant client 104, and return endorsements 128.

Figure 1B:
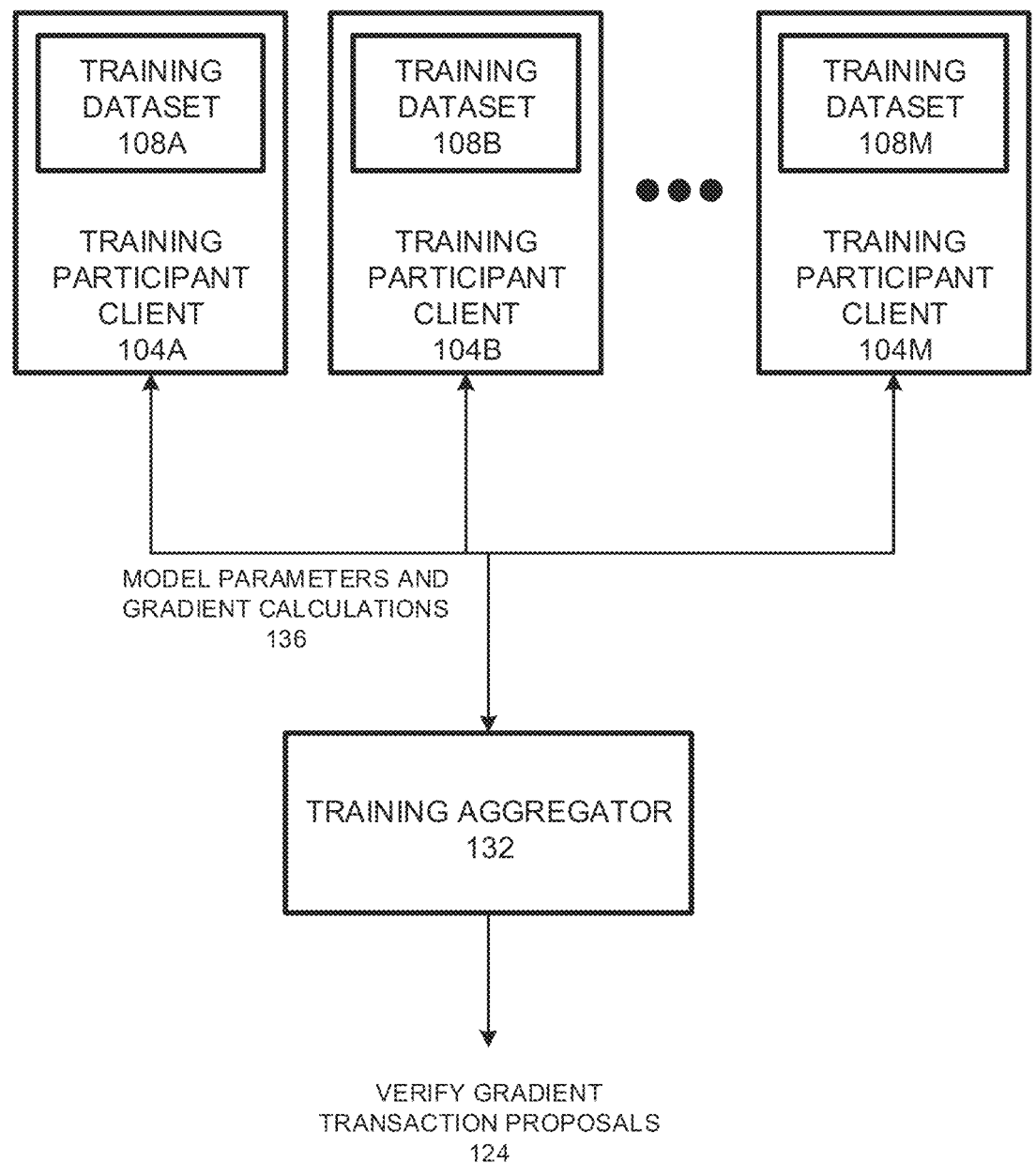
FIG. 1B illustrates a block diagram of a training participant network, according to example embodiments.

FIG. 1B illustrates a block diagram of a training participant network 112, according to example embodiments. Referring to FIG. 1B, the training participant network 112 may include a group of training participant clients 104, each including a training datatset 108. The training participant network 112 may include any number of training participant clients 104, and FIG. 1B illustrates M training participant clients 104 in the training participant network 112. Training participant client 104A includes training dataset 108A, training participant client 104B includes training dataset 108B, and training participant client 104M includes training dataset 108M.

In one embodiment, such as Google's federated learning, a collaborative process may be required, where training participants 104 train a common model. The training aggregator 132 collects gradient calculations 136 from the training participants 104 and combines them to create an aggregate model. The training aggregator 132 may be a special type of training participant 104 that is responsible for collecting inputs (such as gradients) from different training participants 104 and apply them to the model being collectively trained. It is desirable to enable verification of updates in this distributed machine learning setting in order to ensure that no training participant 104 is cheating. Model parameters 136 specify/describe a model in mathematical terms. These parameters 136 are used during prediction. In collaborative machine learning applications, there may be multiple training participants 104 contributing their own individual datasets 108.

Each of the training participant clients 104 provides gradient calculations 136 to the training aggregator 132. The gradient calculations 136 are performed by each of the training participant clients 104 against its own training dataset 108. The training aggregator 132 in one embodiment is a blockchain client, and in other embodiments may include a trusted blockchain node or peer. The illustrated embodiment assumes the training aggregator 132 is also a trusted blockchain node or peer. The training aggregator generates verify gradient transaction proposals 124 in response to the received gradient calculations 136.

Figure 1C:
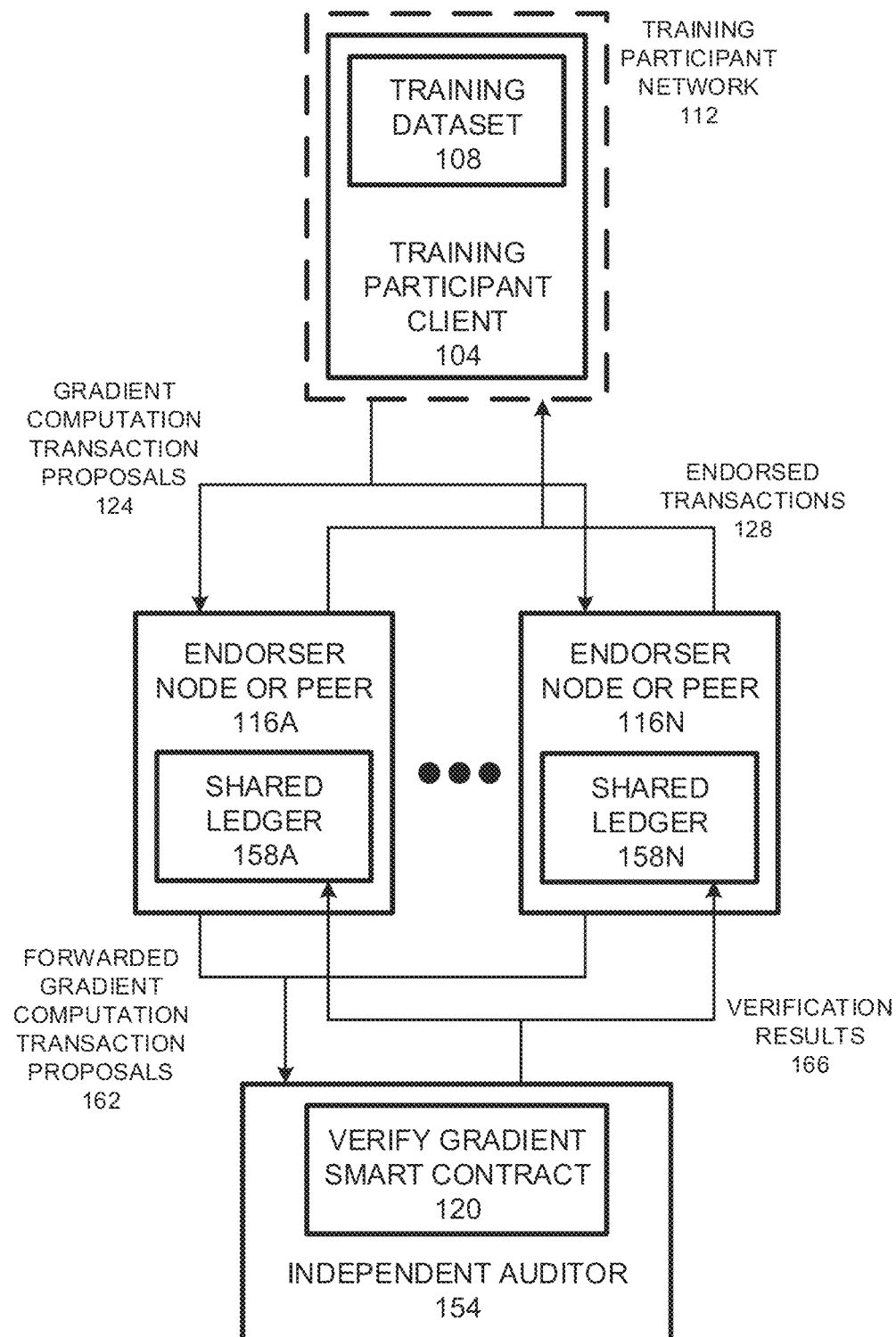
FIG. 1C illustrates a block diagram of a training participant network, according to example embodiments.

FIG. 1C illustrates a block diagram of an alternate embodiment of a gradient calculation verification system 150, according to example embodiments. Referring to FIG. 1B, the training participant network 150 may include endorser nodes or peers 116 that may not include the verify gradient smart contract 120. Instead, a trusted independent auditor 154 may be accessible by the endorser nodes or peers 116. The independent auditor 154 is an auditing entity (such as a government agency) responsible in verifying the progress of a machine learning training process. Endorser nodes or peers 116 may refer to an independent auditor 154 to execute the verify gradient smart contract 120 and verify gradient computation steps. In response to receiving the gradient computation transaction proposals 124 from the training participant network 112, the endorser nodes or peer 116 forwards the gradient computation transaction proposals 162 to the independent auditor 154.

The independent auditor 154 executes the verify gradient smart contract 120 on the received forwarded gradient computation transaction proposals 162. The verification results 166 may include endorsements or rejected transaction proposals, and are returned to the endorser nodes or peers 116, where the verification results 166 are eventually included in the shared ledger 128 of the gradient calculation verification system 150. Each endorser node or peer 116 includes a copy of the shared ledger 158, with endorser node or peer 116A including shared ledger 158A and endorser node or peer 116N including shared ledger 158N.

The verify gradient smart contract 120 performs the following steps:

First, the verify gradient smart contract 120 chooses a random scalar $\beta$ and a random unit vector $\mu$. Next, the verify gradient smart contract 120 uses the following formula to verify correctness of the gradients:

Verify gradient function($W_t, g_t, \beta, B$)=|$\Sigma(x \in B)L(W_t+\beta\mu; x)-L(W_t;x)-|B|\beta(g^T\mu)|<\tau$ $W_t$ refers to model parameters (weight parameters)
$g_t$ refers to the gradient g computed to the $t_{th}$ iteration
$\Sigma$ refers to a sum of what follows
x refers to one sample in a batch B used to initiate the smart contract
B refers to the batch, which is a subset of samples used to compute the model update L is the loss function, which represents a cost metric related to prediction accuracy that machine learning algorithms attempt to optimize. The loss function L which is being optimized during training has two input arguments—one is the current model parameter $W_t$ and the other is the sample x. ";" is a separator notation that separates two arguments of the loss function
Since B is a set of points, |B| refers to the number of points in B (cardinality of B)
$g_t$ refers to the gradient g computed to the $t_{th}$ iteration
$g^T$ refers to a vector transpose operation used to compute element-wise products of two vectors
$\tau$ is a small suitable threshold parameter. $\tau$ may be set to $\beta^2*$ a smoothness parameter.

The smoothness parameter is that of the loss function L and is application dependent.
The smoothness parameter is an upper bound on the absolute value of eigenvalues of the Hessian of the loss function L In order to verify correctness of the gradient calculation, the verify gradient smart contract 120 applies Taylor's expansion on the loss function L using the current model parameters & at a small perturbation of the model parameters in the random direction chosen and random step size chosen. A small perturbation reflects a small change in the values of model parameters. The random direction refers to the random unit vector $\mu$. This is chosen by the verify gradient smart contract 120. The step size is the random scalar $\beta$, which is also chosen by the verify gradient smart contract 120. Given that the step size $\beta$ is small, the above formula holds. A small step size means that the scalar $\beta$ has to be very sufficiently small in magnitude to other parameters.

Figure 2A:
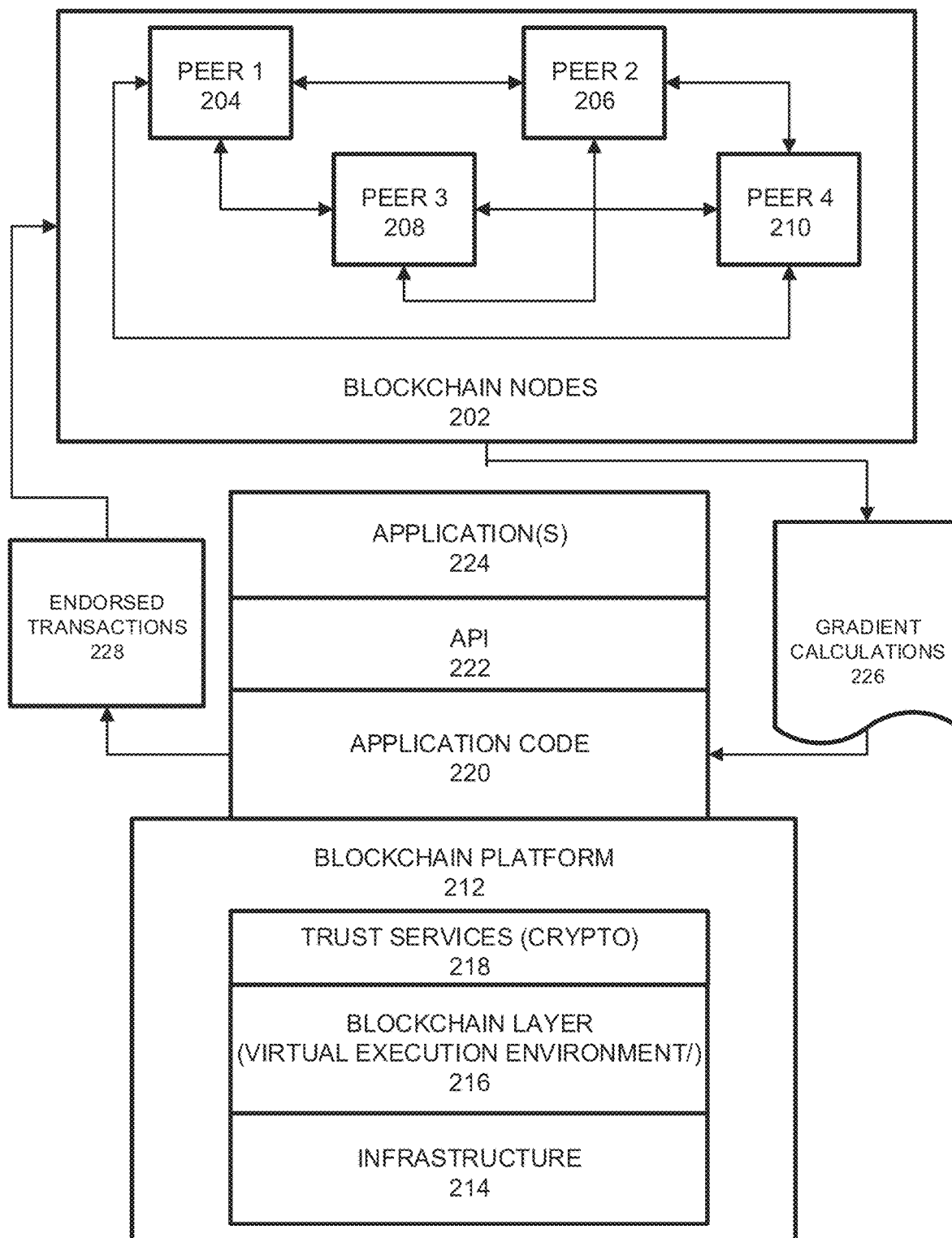
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include gradient calculations from one or more training participant clients and may be processed by one or more processing entities (e.g., virtual machines) included in the blockchain layer 216. The result 228 may include endorsed transaction proposals from executing a verify gradient smart contract. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
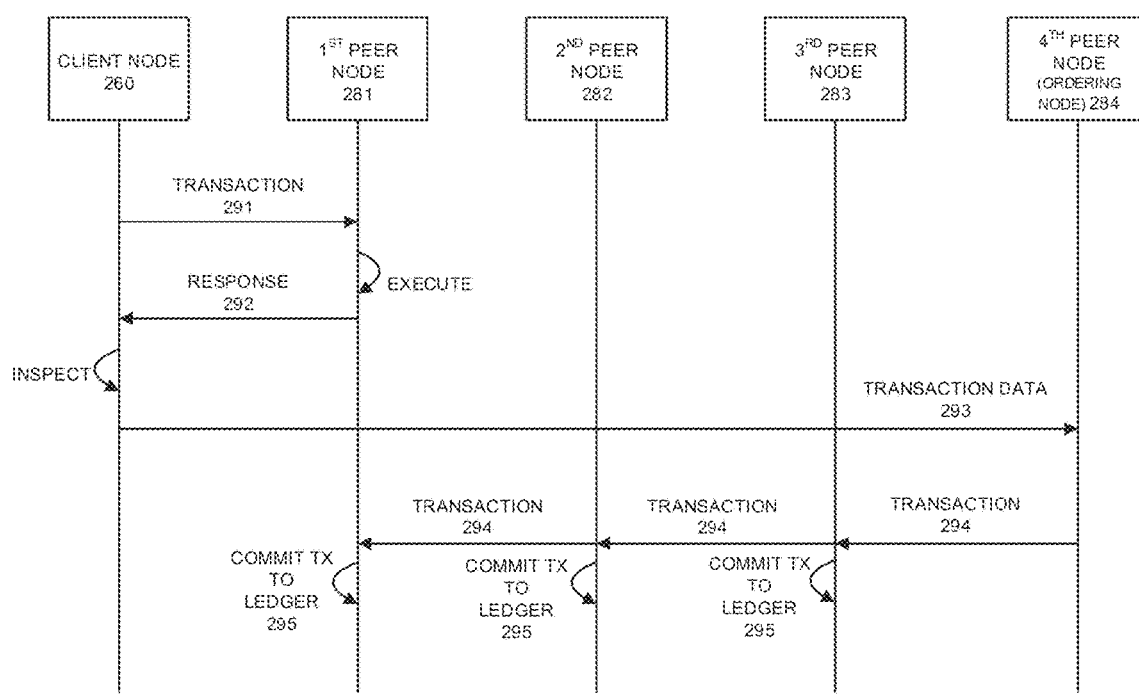
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
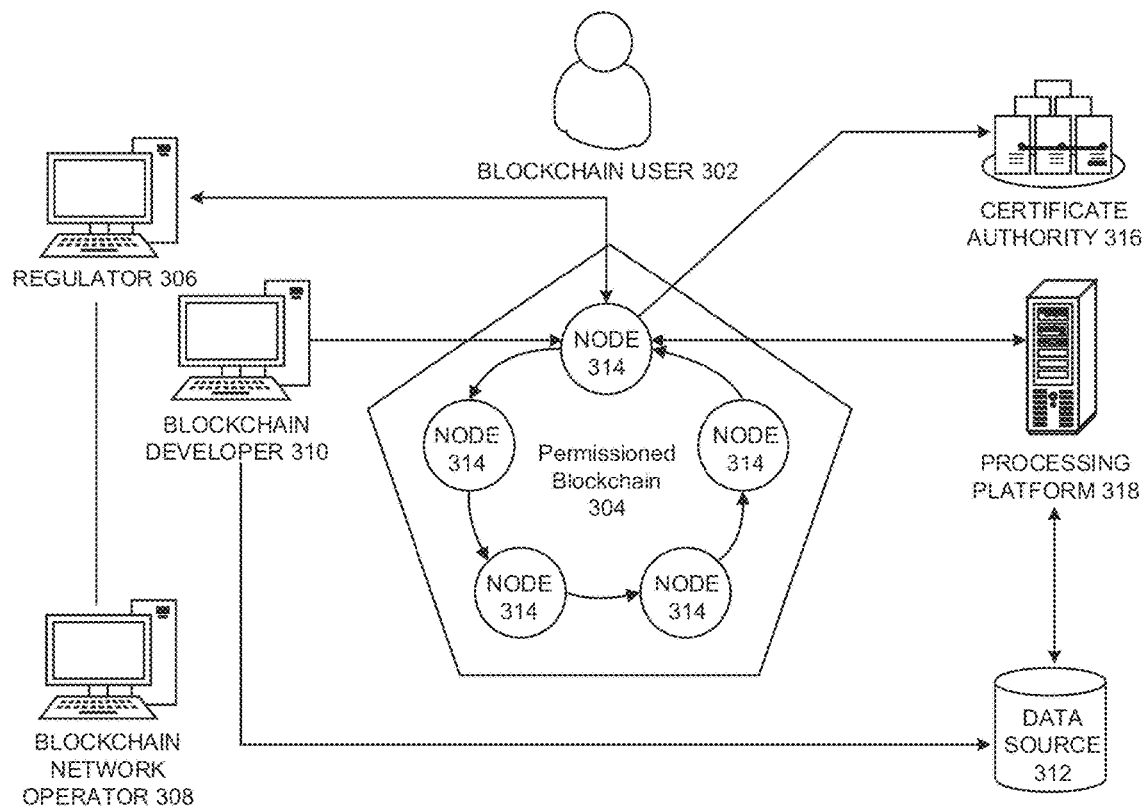
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
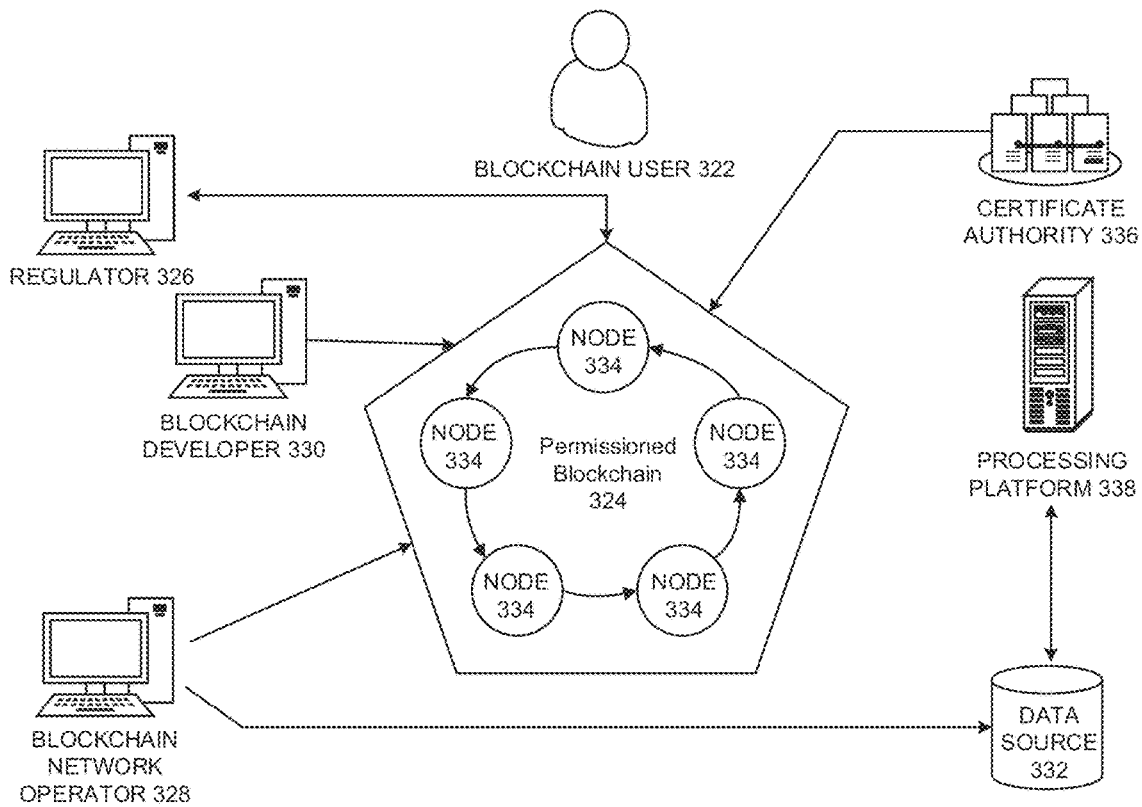
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
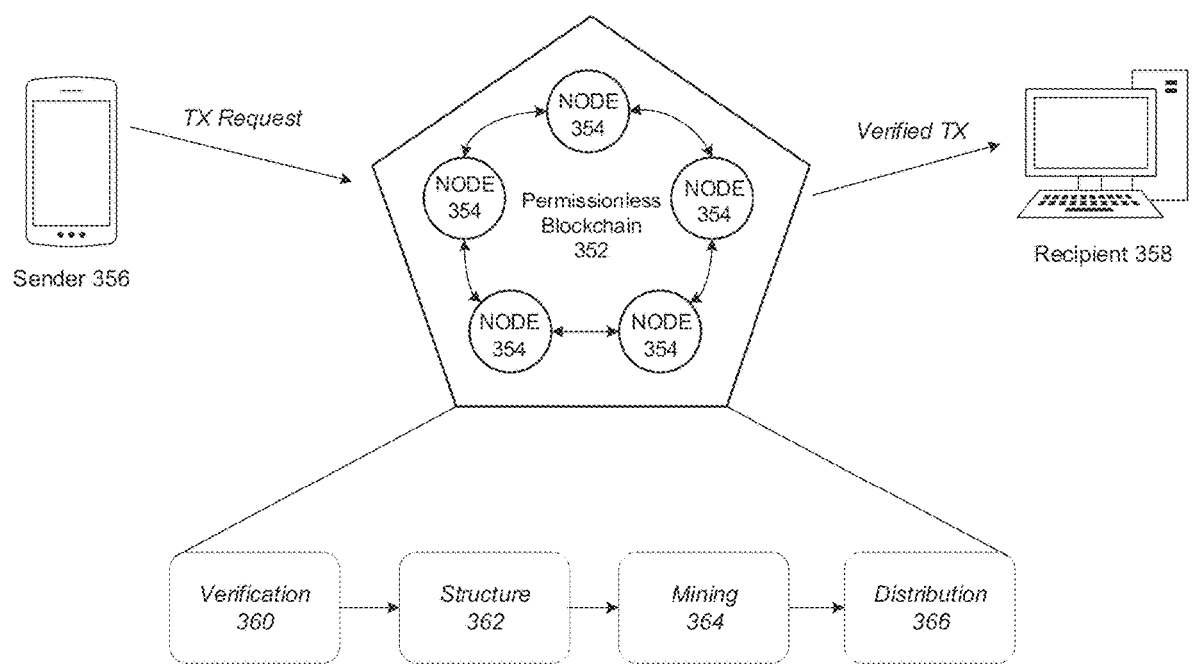
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4:
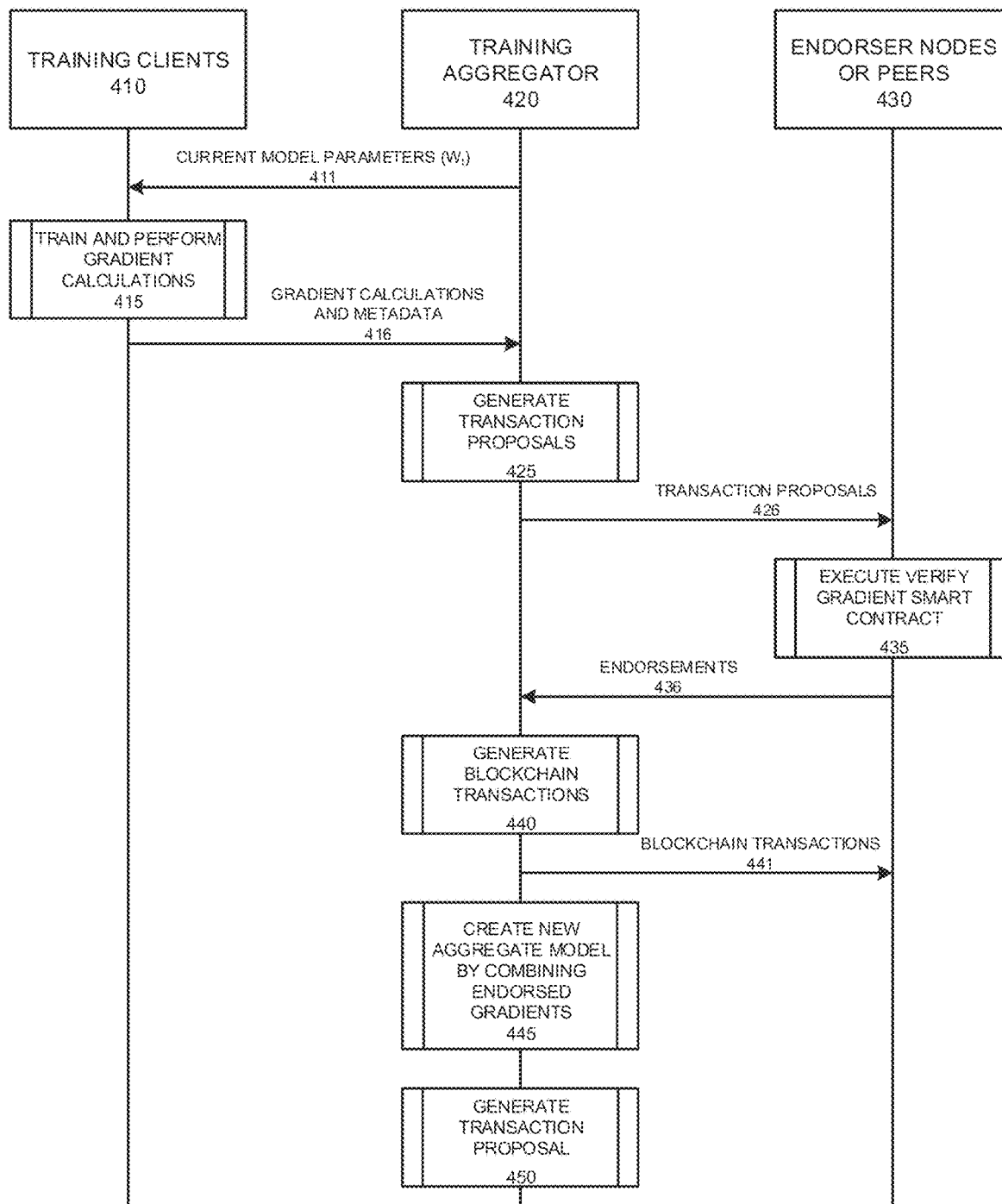
FIG. 4 illustrates a system messaging diagram for validating gradient calculations in a blockchain, according to example embodiments.

FIG. 4 illustrates a system messaging diagram for validating gradient calculations in a blockchain, according to example embodiments. Referring to FIG. 4, the system diagram 400 includes training clients 410, a training aggregator 420, and endorser nodes or peers 430. In the illustrated embodiment, it is assumed the training aggregator 420 is also a trusted node or peer of the same blockchain network as the endorser nodes or peers 430. However, in other embodiments, the training aggregator 420 may be a client and communicate to the endorser nodes or peers 430 through a separate trusted node or peer.

The training clients 410 first receive current model parameters 411 from the training aggregator 420. Each of the training clients 410 trains and performs gradient calculations 415 on a local dataset, and transfers the gradient calculations and metadata 416 to the training aggregator 420. In turn, the training aggregator 420 generates transaction proposals 425 for each of the received gradient calculations and metadata 416. The transaction proposals 426 are next sent to endorser nodes or peers 430 of the blockchain network.

The endorser nodes or peers 430 receive the transaction proposals 426, and execute a verify gradient smart contract 435. The verify gradient smart contract 435 obtains parameters from the transaction proposals 426 and approves or rejects transaction proposals 426 by attempting to approve the gradient calculations 416. If the verify gradient smart contract is able to approve transaction proposals 426, it returns endorsements 436 to the training aggregator 420, otherwise it returns rejections. The training aggregator 420 gathers the endorsements 436 from the endorser nodes or peers 430 and generates blockchain transactions 440 that are then submitted 441 to the blockchain network.

The training aggregator 420 creates a new aggregate machine learning model by combining the endorsed gradients 445, and then generates new transaction proposals 450.

Figure 5A:
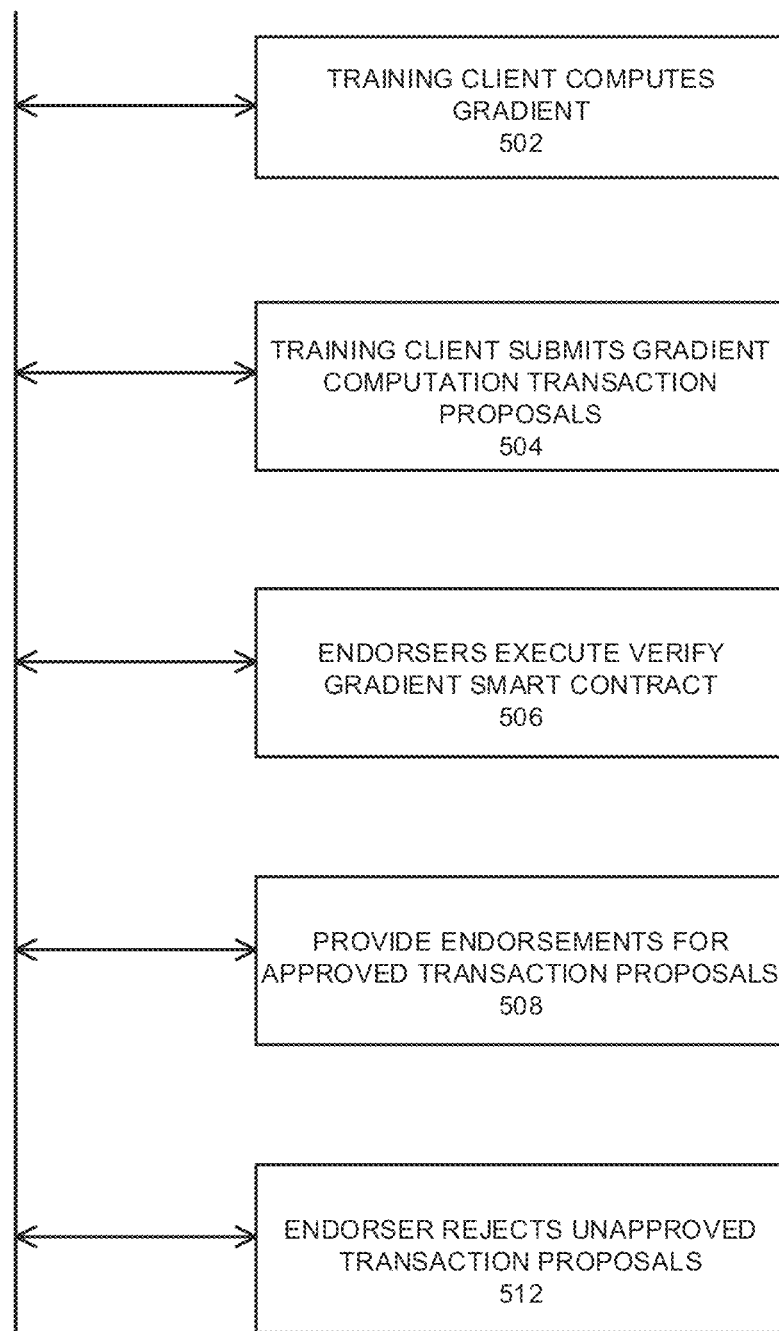
FIG. 5A illustrates a flow diagram of an example method of validating a machine learning computation in a blockchain, according to example embodiments.

FIG. 5A illustrates a flow diagram 500 of an example method of validating a machine learning computation in a blockchain, according to example embodiments. Referring to FIG. 5A, the method 500 may include one or more of the following steps.

At block 502, a training participant client computes a gradient for a machine learning or artificial intelligence model training step.

At block 504, the training participant client submits a gradient computation transaction proposal to a blockchain network. In one embodiment, the training participant client submits a request for the gradient computation to be verified to a trusted node or peer of the blockchain network. The trusted node or peer receives the request, and submits the corresponding transaction proposal to the blockchain network.

At block 506, one or more endorser nodes or peers of the blockchain network receive the transaction proposal, and execute a verify gradient smart contract. The verify gradient smart contract evaluates the content of the transaction proposal in order to determine if the transaction proposal is valid or not. In one embodiment, the endorser nodes or peers do not include the verify gradient smart contract. In that case, the endorser nodes or peers forward the transaction proposals to one or more independent auditors outside the blockchain network. The independent contractors include the verify gradient smart contract, and execute it against the transaction proposals to provide endorsement. In this case, the endorser nodes or peers would provide the endorsed transaction proposals to the training participant client or a trusted blockchain node or peer that processes the endorsements.

At block 508, the endorser nodes or peers provide endorsements for approved transaction proposals.

At block 512, the endorser nodes or peers reject unapproved transaction proposals.

Figure 5B:
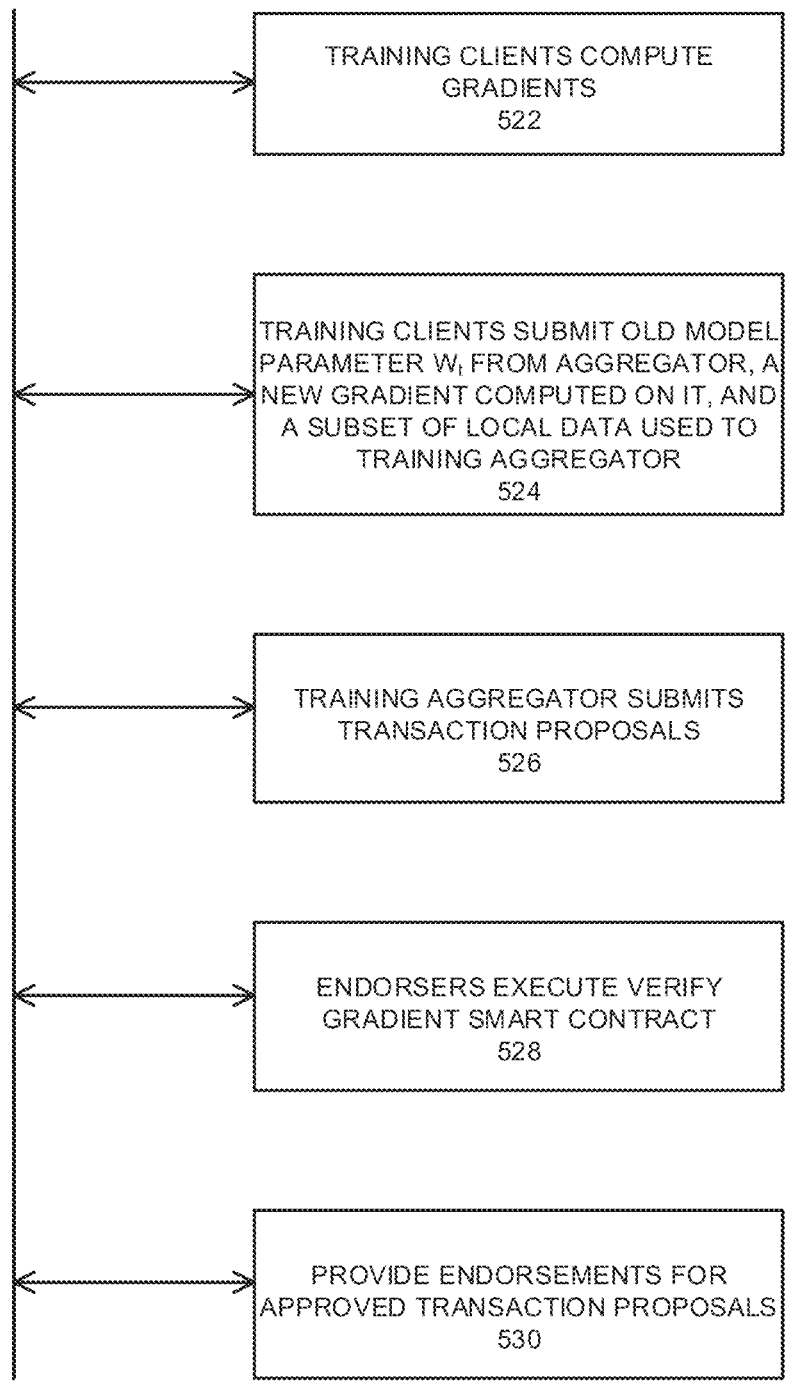
FIG. 5B illustrates a flow diagram of an example method of validating training aggregator computations in a blockchain, according to example embodiments.

FIG. 5B illustrates a flow diagram 520 of an example method of validating training aggregator computations in a blockchain, according to example embodiments. Referring to FIG. 5B, the method 520 may include one or more of the following steps.

At block 522, a group of training participant clients compute gradients for a machine learning or artificial intelligence training calculation.

At block 524, the group of training participant clients submit the original model parameter $W_t$ received from the a training aggregator, the new gradient computed on it, and the subset of their local data used to the training aggregator.

At block 526, the training aggregator converts the gradient calculations to transaction proposals, and submits transaction proposals to a blockchain network.

At block 528, one or more endorser nodes or peers receive the transaction proposals, and execute a verify gradient smart contract to validate the transaction proposals. In one embodiment, the endorser nodes or peers do not include the verify gradient smart contract. In that case, the endorser nodes or peers forward the transaction proposals to one or more independent auditors outside the blockchain network. The independent contractors include the verify gradient smart contract, and execute it against the transaction proposals to provide endorsement. In this case, the endorser nodes or peers would provide the endorsed transaction proposals to the training aggregator.

At block 530, the endorser nodes or peers provide endorsements for the approved transaction proposals.

Figure 5C:
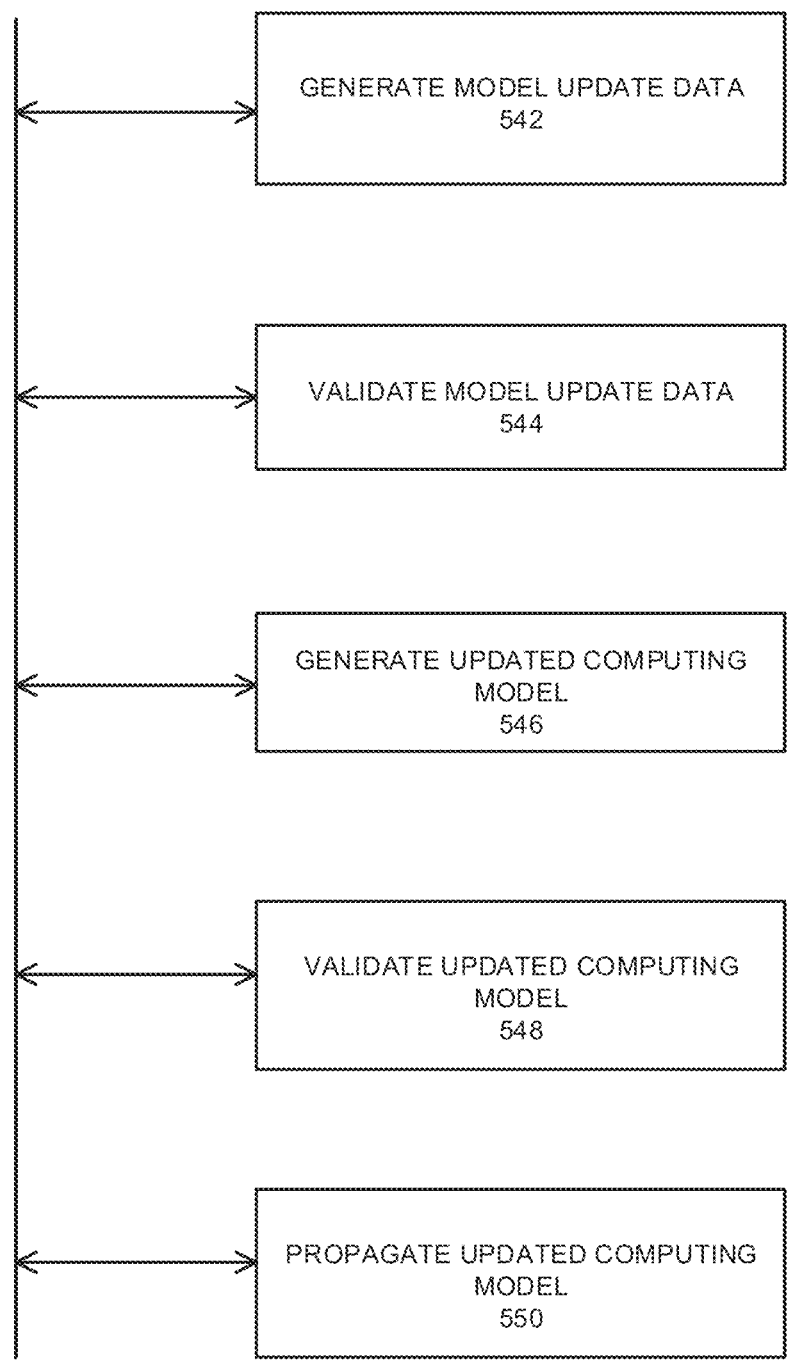
FIG. 5C illustrates a flow diagram for validating model updates in a blockchain, according to example embodiments.

FIG. 5C illustrates a flow diagram 540 for validating model updates in a blockchain, according to example embodiments. Referring to FIG. 5C, the method 540 may include one or more of the following steps.

At block 542, model update data is generated. In various embodiments, blockchain nodes may each be loaded with one or more computing models configured to perform various machine learning and artificial intelligence operations. In various embodiments, initial setup, installation, configuration, or the like of the computing models may vary and be completed using any suitable technique. For example, participation in the system may be limited based on a defined list of certificates (where certificates are generated for new nodes joining a system), may be restricted based on a private network configuration, may be restricted based on issued blockchain addresses, or the like.

A node may detect a model update event. For example, a node may detect the model update event while operating the computing model, through a transmission (e.g., an update is transmitted to the node), or the like. The model update event may comprise a prediction error, a new model requirement, a customization event, or the like. For example, the prediction error may relate to an incorrect identification using the computing model, or may be associated with any other suitable or desired error. The new model requirement may relate to a new identification needed for the computing model. For example, wherein the computing model is configured to recognize inventory in a store, a new model requirement may be in response to a new good (e.g., soda, etc.) being offered as inventory in the store.

The node generates model update data based on the model update event. The model update data may comprise training data (e.g., data to be ingested by a node to "train" the computing model to cure the prediction error, detect the new model requirement, etc.), a model update (e.g., programmable code to merge with the computing model to cure the prediction error, detect the new model requirement, etc.), and/or a new computing model. A node transmits the model update data to a validation node.

At block 544, the model update data is validated. In various embodiments, a validation node may transmit the model update data based on a distribution algorithm or the like. For example, and in accordance with various embodiments, delegation to a limited number of validation nodes may be controlled or established via a delegated proof of stake system. As a further example, delegation may be controlled by a smart contract (e.g., a publish and subscribe model) where validation and model updating is performed by one or more validation nodes. As a further example, delegation may be controlled by signed authorizations used to establish relationships between the nodes. In various embodiments, delegation to validation nodes may also be static and defined, where each node may include instructions detailing one or more validation nodes to transmit the model update data to. In various embodiments, one or more validation nodes may also publish contracts and offer a payment or the like to validate and/or update the model update data. Nodes may select one or more validation nodes based on the published contracts.

In various embodiments, in response to a validation node (and/or a plurality of validation nodes) receiving a plurality of model update data transmission simultaneously, in near time, or the like, the order of updating computing models may be based on a time stamp (e.g., time stamp present in the model update data, or a time stamp of when the validation node received the model update data). In various embodiments, the received plurality of model update data may also be aggregated and/or averaged together using an averaging model or algorithm.

In response to receiving the model update data, the validation node validates the model update data. The validation node may broadcast the model update data to one or more other validation nodes in validation network. Validation nodes may establish consensus to the model update data using any suitable or desired consensus method or algorithm, such as, for example, proof of work, proof of stake, practical byzantine fault tolerance, delegated proof of stake, or any other suitable consensus algorithm. Validation nodes may also be configured to validate the model update data by locally testing the model update data to determine whether the model update data cures the prediction error, detects the new model requirement, or the like. For example, validation nodes may locally implement the test data and/or model update, and may process data using the computing model to determine whether the prediction error is still an issue, whether the new model requirement can be detected, or the like. As a further example, validation nodes may test the model update data to identity false positives, false negatives, or the like. Testing may also be performed by a human to identify new scenarios and/or to validate the model update data. Validation node writes the model update data to model blockchain.

The validation node may be configured to write the model update data to the model blockchain together with any other suitable data, such as, for example a hash of the model update data, a date or timestamp, identifying information of the node that transmitted the model update data (e.g., IP address, blockchain address, etc.), and/or any other suitable data or metadata. The validation node propagates the write to the validation network. For example, the validation node may broadcast the write data (e.g., data associated with the block written to model blockchain the model update data, etc.) to one or more validation nodes in validation network. Each validation node may be configured to write the model update data to its associated local model blockchain.

At block 546, an updated computing model is generated. In various embodiments, the validation node generates an updated computing model based on the model update data. For example, the validation node may be configured to generate the update computing model by merging the preexisting computing model with the model update data. For example, the preexisting computing model may be recomputed or retrained using the new training data, or parameters of the preexisting computing model may be changed based on the model update data.

At block 548, the updated computing model is validated. The validation node validates the updated computing model. The validation node may broadcast the updated computing model to one or more other validation nodes in validation network. The validation nodes may establish consensus to the updated computing model using any suitable or desired consensus method or algorithm, such as, for example, proof of work, proof of stake, practical byzantine fault tolerance, delegated proof of stake, or any other suitable consensus algorithm. The validation nodes may also be configured to validate the updated computing model by locally testing the updated computing model to determine whether the updated computing model cures the prediction error, detects the new model requirement, or the like. For example, the validation nodes may locally implement the updated computing model, and may process data using the computing model to determine whether the prediction error still results, to detect detects the new model requirement, or the like. The validation node writes the updated computing model to the model blockchain. The validation node may be configured to write the updated computing model to the model blockchain together with any other suitable data, such as, for example a hash of the updated computing model, a date or timestamp, identifying information of the node that transmitted the model update data (e.g., IP address, blockchain address, etc.), and/or any other suitable data or metadata.

At block 550, the updated computing model is propagated. The validation node propagates the write to the validation network. For example, the validation node may broadcast the write data (e.g., data associated with the block written to the model blockchain, the updated computing model, etc.) to one or more validation nodes in the validation network. Each validation node may be configured to write the updating computing model to its associated local model blockchain. The validation node broadcasts the updated computing model to node. In various embodiments, the validation node may broadcast the validated model update data to one or more nodes, instead of the updated computing model. In various embodiments, the validation node may broadcast the updated computing model based on a distribution algorithm or the like.

Figure 6A:
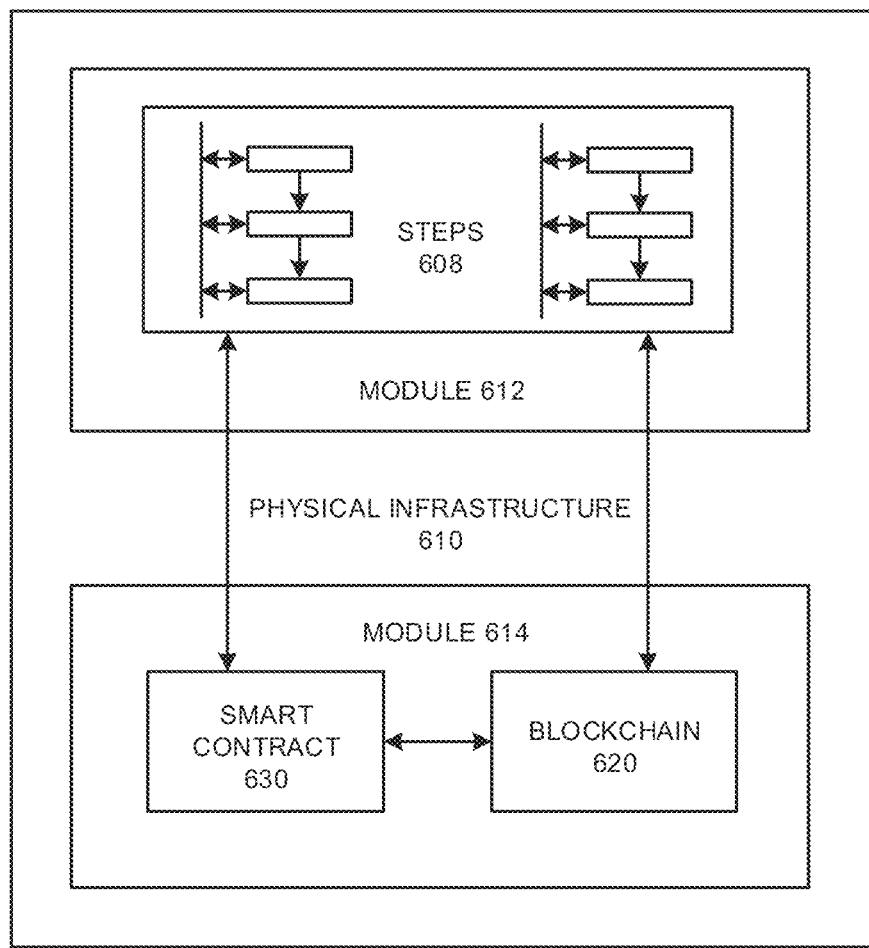
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
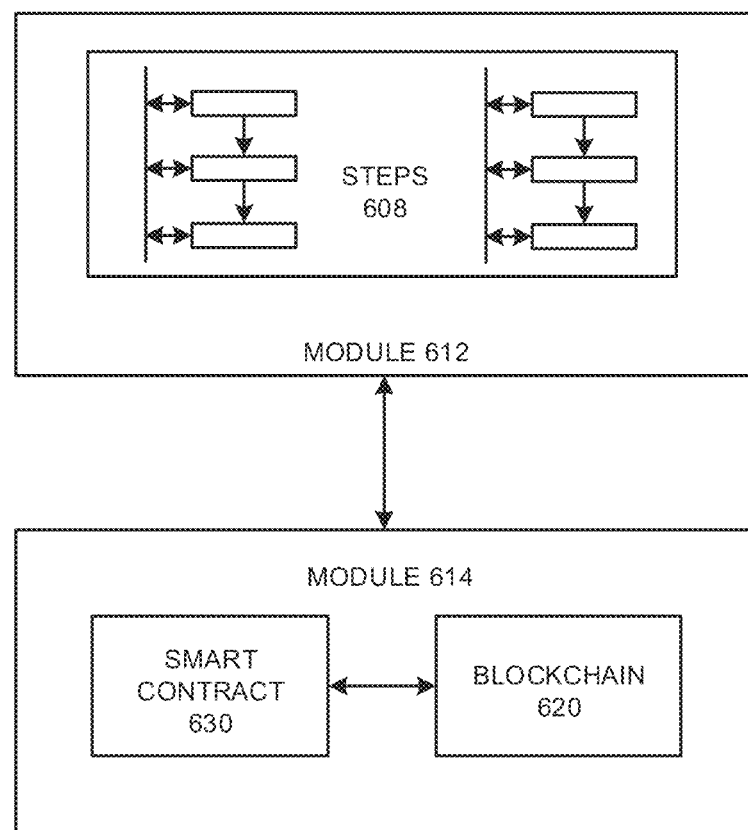
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
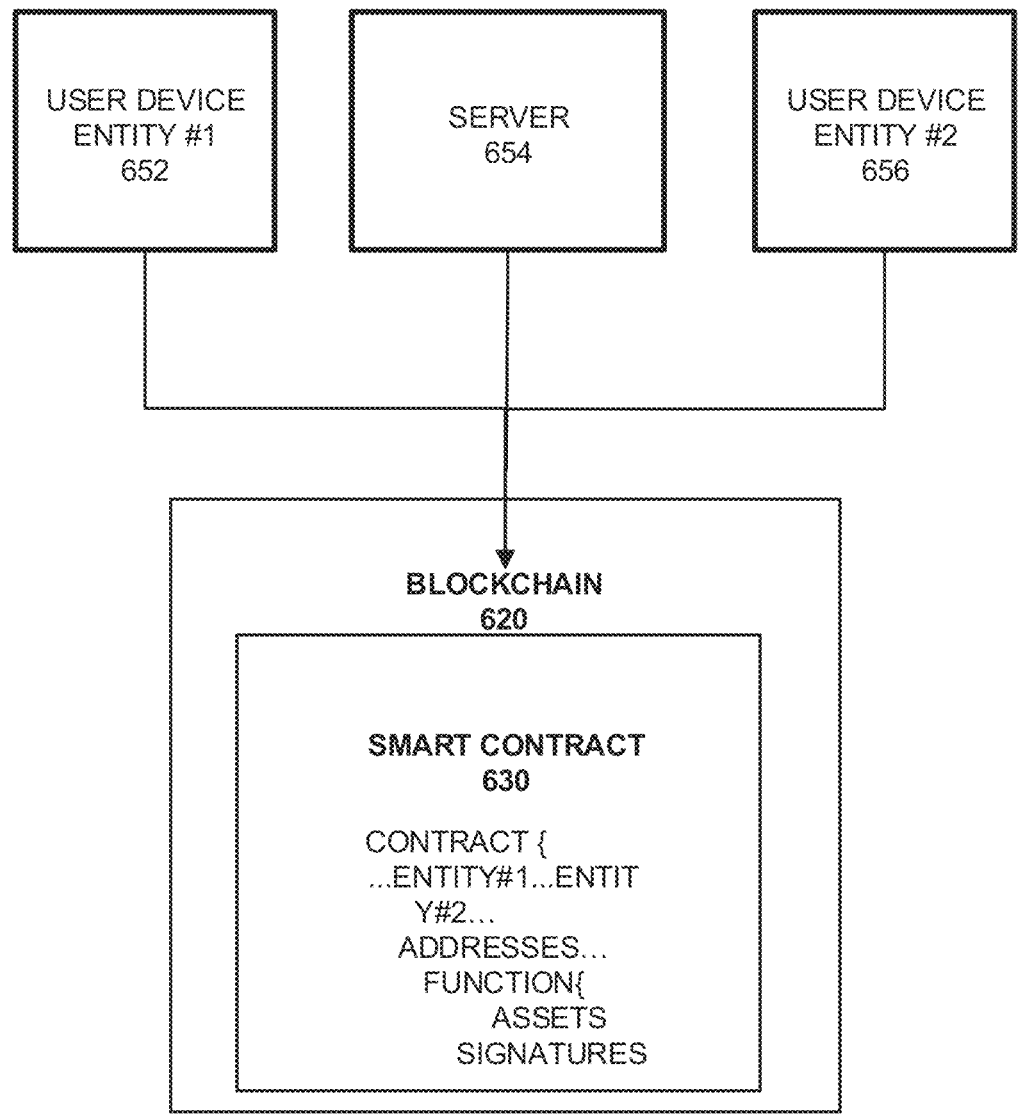
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
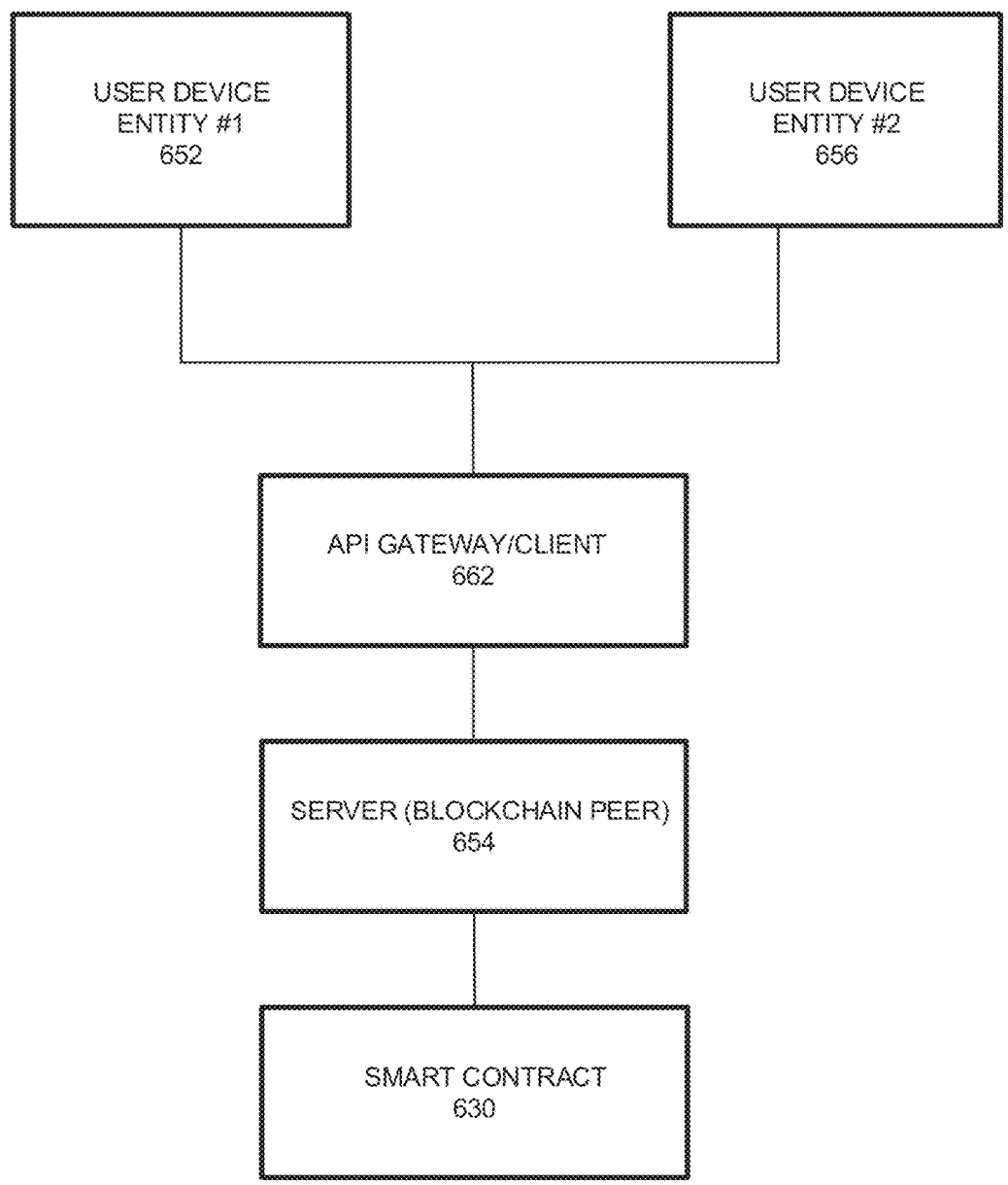
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
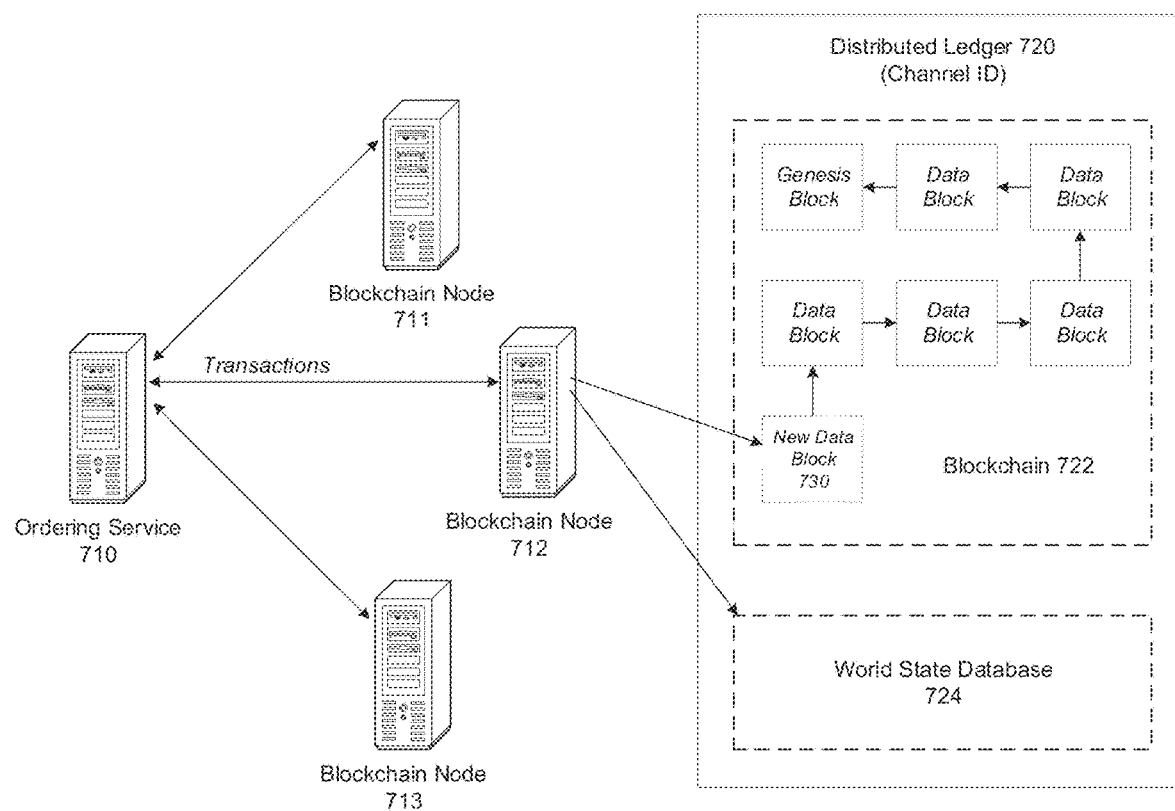
FIG. 7A illustrates a process for a new block being added to a distributed ledger, according to example embodiments.
Figure 7B:
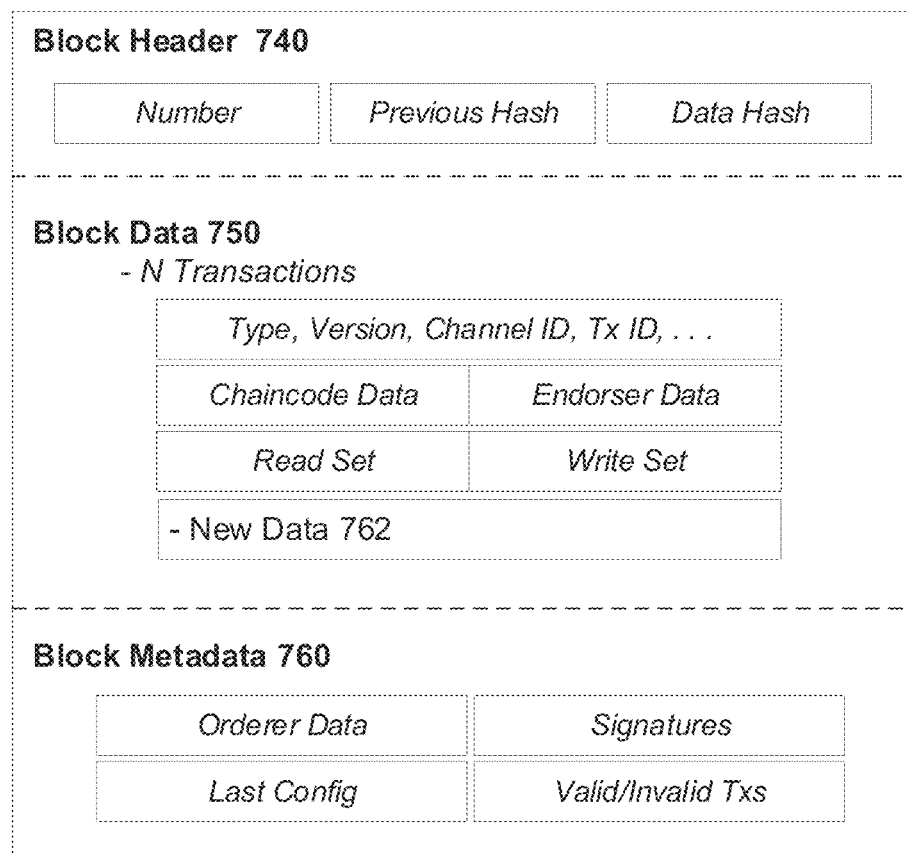
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
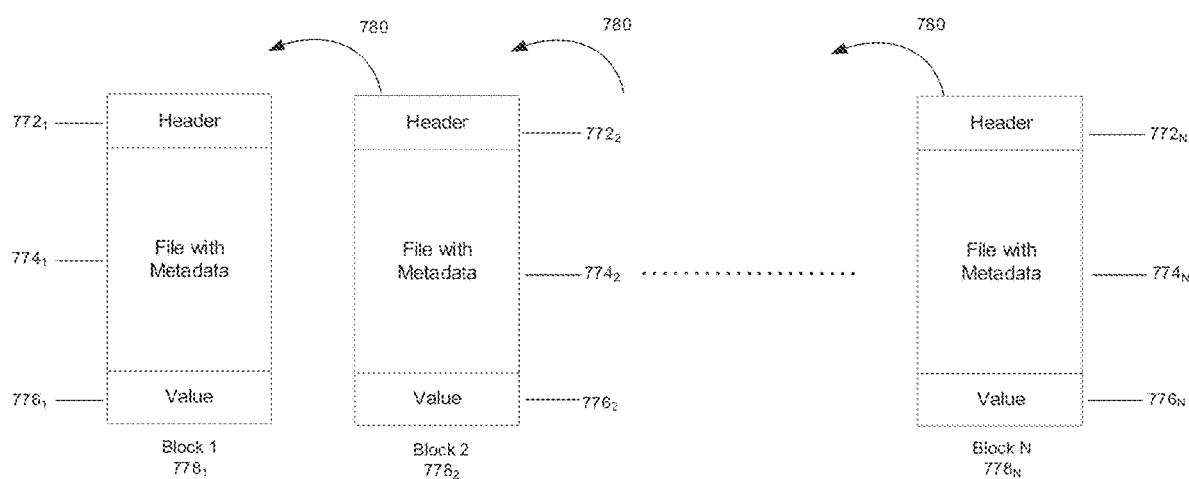
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where $N \geq 1$. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
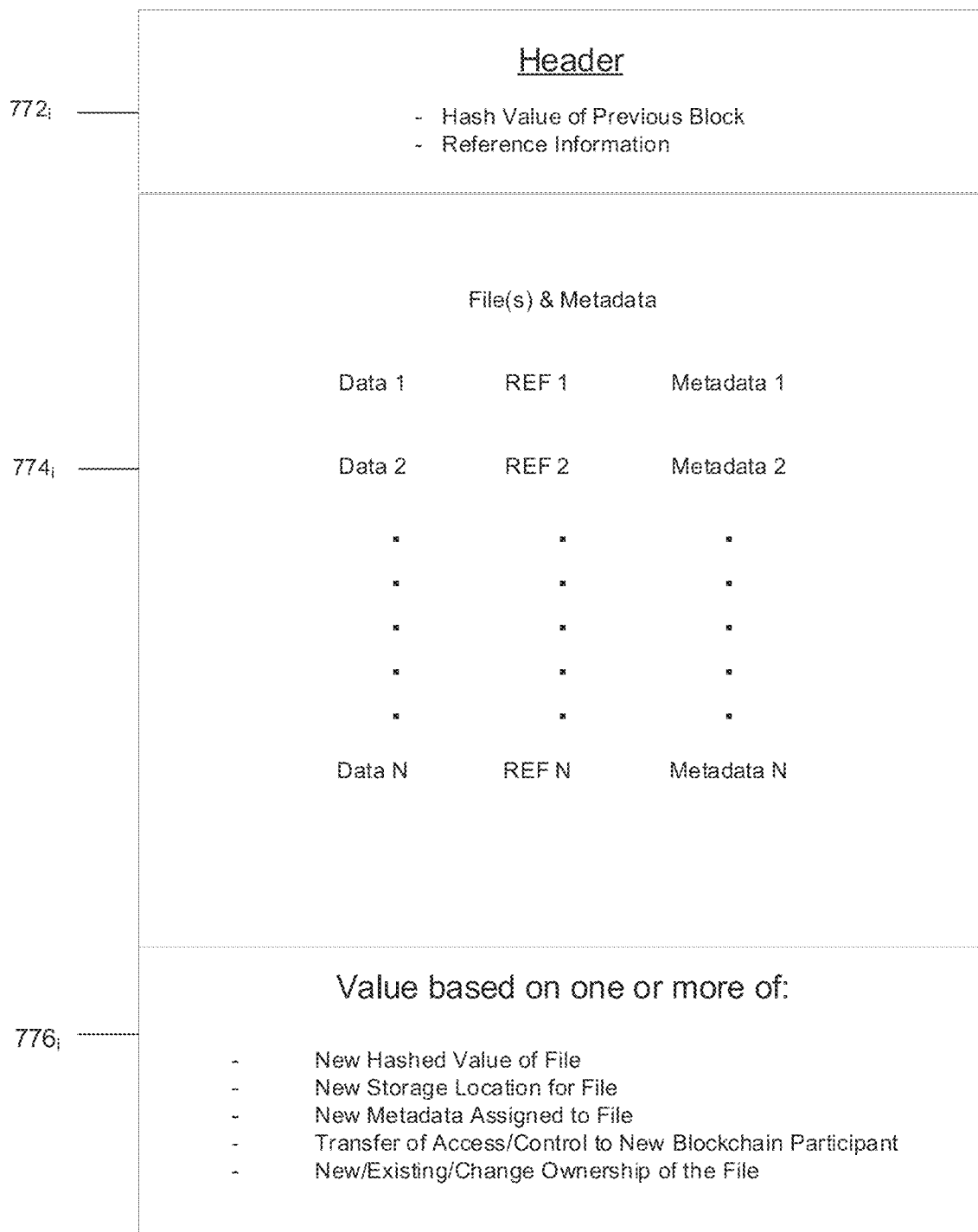
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
    b) new storage location for the file
    c) new metadata identified associated with the file
    d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship.

The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
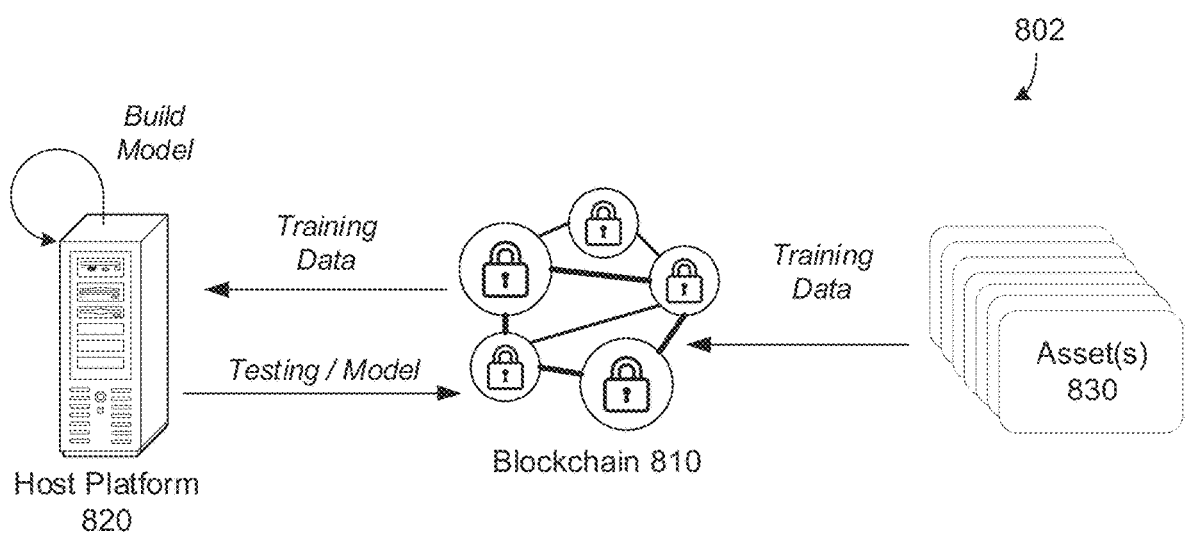
FIG. 8A illustrates an example blockchain which stores machine learning (artificial intelligence) data, according to example embodiments.
Figure 8A:
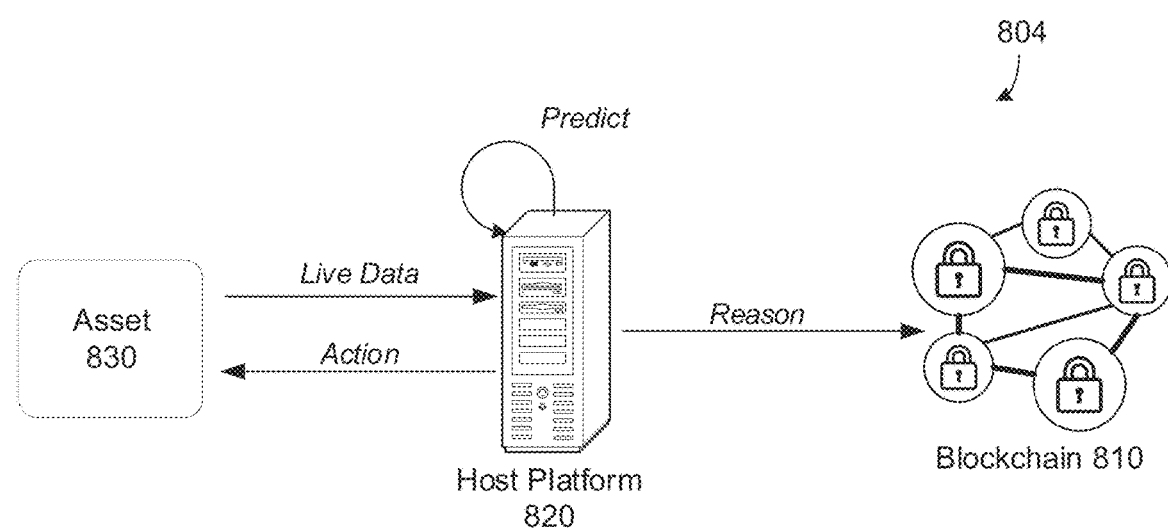
Figure 8B:
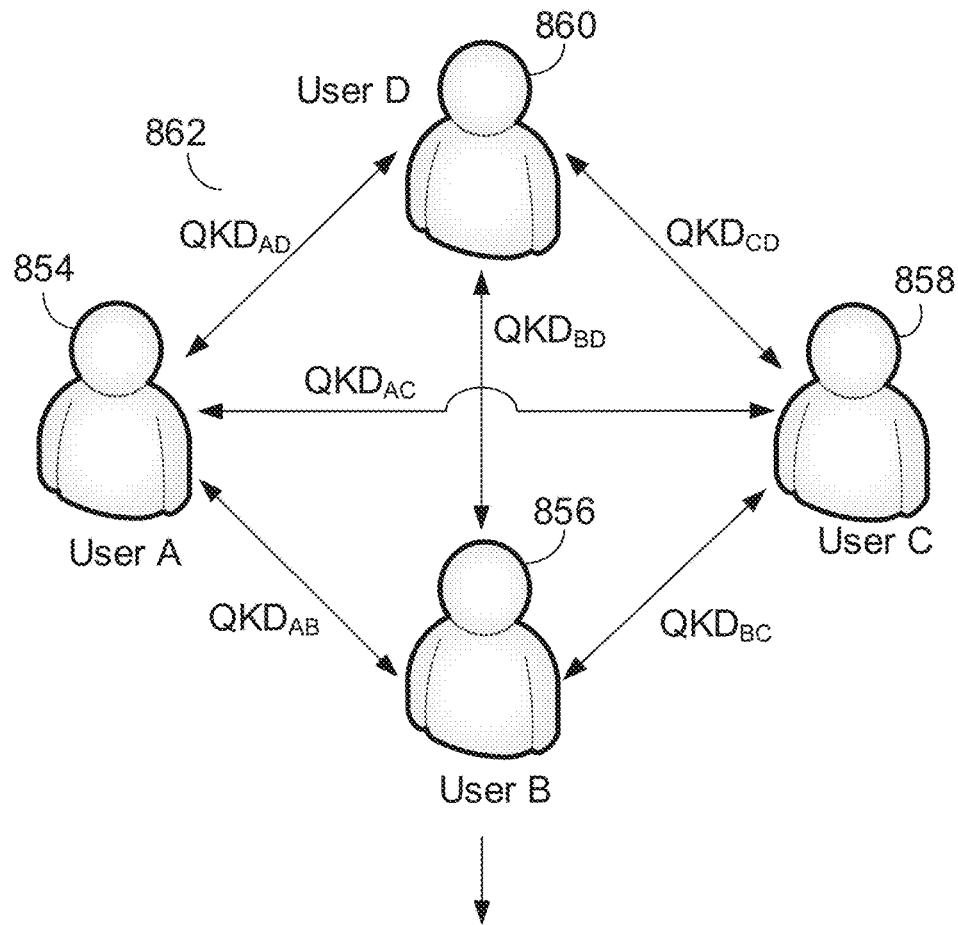
FIG. 8B illustrates an example quantum-secure blockchain, according to example embodiments.
Figure 8B:
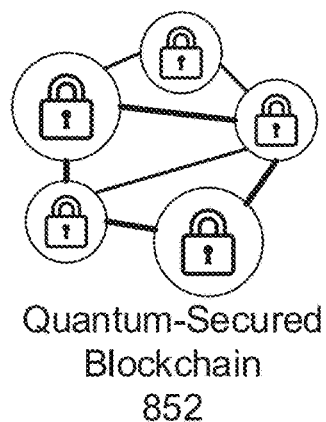

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model.

In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$.

Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
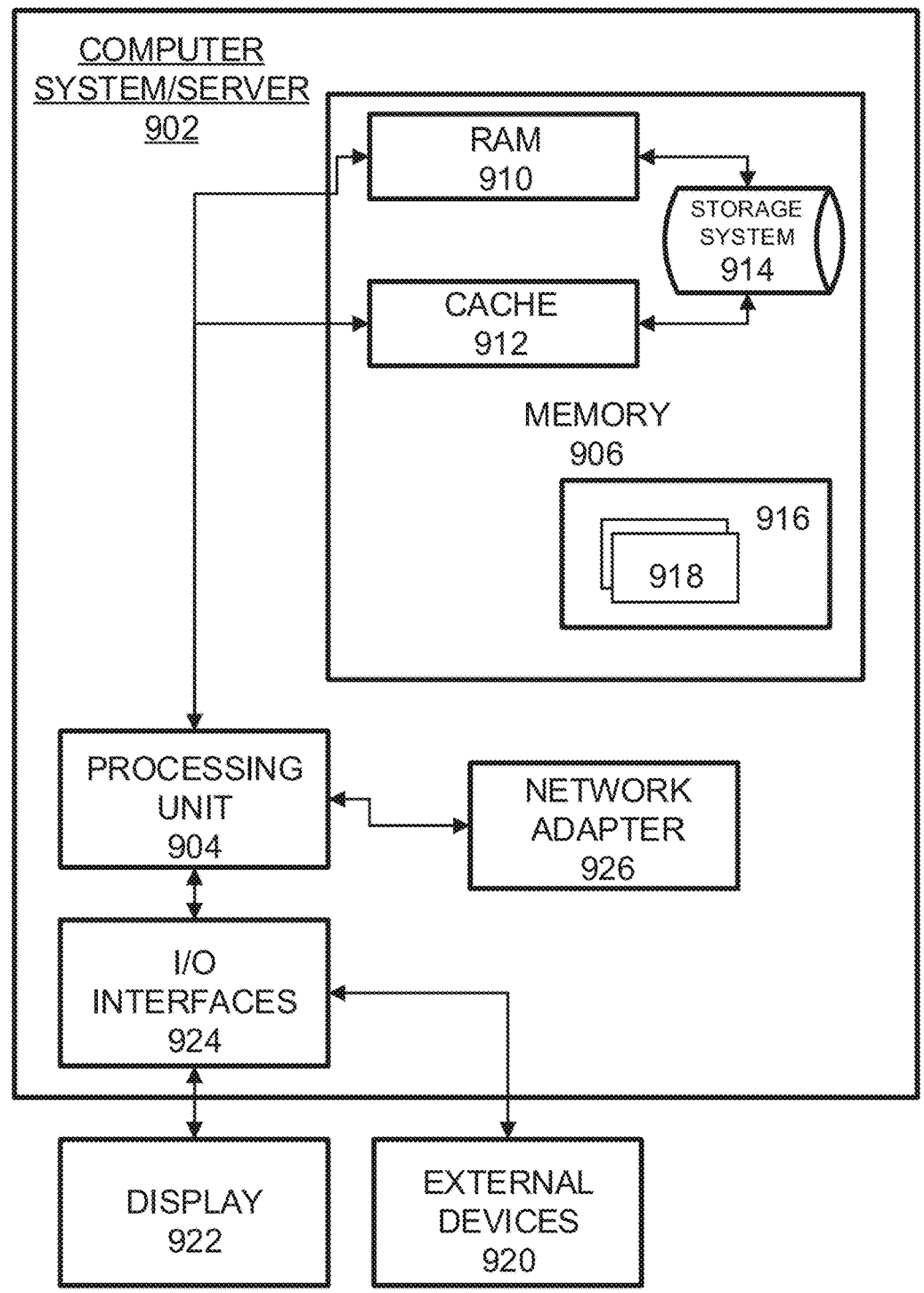
FIG. 9 illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a training aggregator in a blockchain network, the training aggregator comprising a processor that when executing one or more instruction stored in a memory configures the training aggregator to:
receive, from each training client of a plurality of training clients in the blockchain network, a gradient calculation corresponding to a training iteration for machine learning model training, wherein each gradient calculation is calculated using a training dataset of a corresponding training client; and
generate a plurality of transaction proposals, each transaction proposal corresponding to a training client of the plurality of training clients and each transaction proposal containing the corresponding gradient calculation, a batch comprising a subset of samples from the dataset, a loss function identifying a cost metric, and an original model parameter, wherein the batch and the original model parameter are stored outside of the blockchain, and wherein the corresponding gradient calculation and the loss function are stored in the blockchain; and an endorser node in the blockchain network, the endorser node comprising a processor that when executing one or more instruction stored in a memory configures endorser node to:
receive the plurality of transaction proposals from the training aggregator,
endorse a transaction proposal, of the plurality of transaction proposals, in response to a validation of the corresponding gradient calculation by the endorser using a verify gradient smart contract of the endorser node, and
send the endorsed transaction proposal to the training aggregator to generate a blockchain transaction using the endorsed transaction proposal.

2. The system of claim 1, wherein, when the endorser node is configured to validate the corresponding gradient calculation, the endorser node is further configured to:
verify a correctness of the corresponding gradient calculation based on parameters obtained from the transaction proposal.

3. The system of claim 1, wherein, when the training aggregator generates the plurality of transaction proposals, the training aggregator is further configured to:
receive the corresponding gradient calculation and a corresponding metadata from the each training client; and
generate each of the plurality of transaction proposals using the corresponding gradient calculation and the corresponding metadata.

4. The system of claim 1, wherein each of the plurality transaction proposals comprise: a batch comprising a subset of samples from the training dataset,
a loss function identifying a cost metric,
current parameter weights, and
the corresponding gradient calculation.

5. The system of claim 1, wherein data and model parameters that correspond to the training dataset are stored outside the blockchain network, and
wherein verification-related data is stored in a blockchain of the blockchain network.

6. The system of claim 1, wherein the training aggregator is further configured to:
combine the plurality of corresponding gradient calculations with a previous machine learning model to create a new machine learning model; and
generate a new transaction proposal using the new machine learning model.

7. The system of claim 6, wherein the endorser node is further configured to:
broadcast the new machine learning model to the blockchain network.

8. A method, comprising:
receiving, by a training aggregator in a blockchain network, a gradient calculation corresponding to a training iteration for machine learning model training from each training client of a plurality of training clients in the blockchain network, wherein each gradient calculation is calculated using a training dataset of a corresponding training client, wherein the training dataset and parameters for the machine learning model training are stored outside of a blockchain of the blockchain network, and wherein the each gradient calculation is stored in the blockchain;
generating, by the training aggregator, a plurality of transaction proposals, each transaction proposal corresponding to a training client of the plurality of training clients and each transaction proposal containing the corresponding gradient calculation, a batch comprising a subset of samples from the dataset, a loss function identifying a cost metric, and an original model parameter, wherein the batch and the original model parameter are stored outside of the blockchain, and wherein the corresponding gradient calculation and the loss function are stored in the blockchain;
receiving, by an endorser node in the blockchain network, the plurality of transaction proposals from the training aggregator;
endorsing, by the endorser node, a transaction proposal, of the plurality of transaction proposals, in response to validating the corresponding gradient calculation using a verify gradient smart contract of the endorser node; and
sending, by the endorser node, the endorsed transaction proposal to the training aggregator to generate a blockchain transaction using the endorsed transaction proposal.

9. The method of claim 8, wherein the validating the corresponding gradient calculation further comprises:
verifying a correctness of the corresponding gradient calculation based on parameters obtained from the transaction proposal.

10. The method of claim 8, wherein the generating the plurality of transaction proposals further comprises:
receiving the corresponding gradient calculation and a corresponding metadata from the each training client; and
generating each of the plurality of transaction proposals using the corresponding gradient calculation and the corresponding metadata.

11. The method of claim 8, wherein each of the plurality transaction proposals comprise: a batch comprising a subset of samples from the training dataset,
a loss function identifying a cost metric,
current parameter weights, and
the corresponding gradient calculation.

12. The method of claim 8, wherein data and model parameters corresponding to the training dataset are stored outside the blockchain network, and
wherein verification-related data is stored in a blockchain of the blockchain network.

13. The method of claim 8, further comprising:
combining, by the training aggregator, the plurality of corresponding gradient calculations with a previous machine learning model to create a new machine learning model; and
generating, by the training aggregator, a new transaction proposal using the new machine learning model.

14. The method of claim 13, further comprising:
broadcasting, by the endorser node, the new machine learning model to the blockchain network.

15. A non-transitory computer readable medium comprising one or more instructions that when executed by one or more processors cause the one or more processors to perform:
receiving, by a training aggregator in a blockchain network, a gradient calculation corresponding to a training iteration for machine learning model training from each training client of a plurality of training clients in the blockchain network, wherein each gradient calculation is calculated using a training dataset of a corresponding training client, wherein the training dataset and parameters for the machine learning model training are stored outside of a blockchain of the blockchain network, and wherein the each gradient calculation is stored in the blockchain;

generating, by the training aggregator, a plurality of transaction proposals, each transaction proposal corresponding to a training client of the plurality of training clients and each transaction proposal containing the corresponding gradient calculation, a batch comprising a subset of samples from the dataset, a loss function identifying a cost metric, and an original model parameter, wherein the batch and the original model parameter are stored outside of the blockchain, and wherein the corresponding gradient calculation and the loss function are stored in the blockchain;

receiving, by an endorser node in the blockchain network, the plurality of transaction proposals from the training aggregator;

endorsing, by the endorser node, a transaction proposal, of the plurality of transaction proposals, in response to validating the corresponding gradient calculation using a verify gradient smart contract of the endorser node; and sending, by the endorser node, the endorsed transaction proposal to the training aggregator to generate a blockchain transaction using the endorsed transaction proposal.

16. The non-transitory computer readable medium of claim 15, wherein the validating the corresponding gradient calculation further comprises:
verifying a correctness of the corresponding gradient calculation based on parameters obtained from the transaction proposal.

17. The non-transitory computer readable medium of claim 15, wherein the generating the plurality of transaction proposals further comprises:
receiving the corresponding gradient calculation and a corresponding metadata from the each training client; and
generating each of the plurality of transaction proposals using the corresponding gradient calculation and the corresponding metadata.

18. The non-transitory computer readable medium of claim 15, wherein each of the plurality transaction proposals comprise: a batch comprising a subset of samples from the training dataset,
a loss function identifying a cost metric,
current parameter weights, and
the corresponding gradient calculation,
wherein data and model parameters corresponding to the training dataset are stored outside the blockchain network,
wherein verification-related data is stored in a blockchain of the blockchain network.

19. The non-transitory computer readable medium of claim 15, wherein the one or more instructions further cause the one or more processor to perform:
combining, by the training aggregator, the plurality of corresponding gradient calculations with a previous machine learning model to create a new machine learning model; and
generating, by the training aggregator, a new transaction proposal using the new machine learning model.

20. The non-transitory computer readable medium of claim 19, wherein the one or more instructions further cause the one or more processors to perform:
broadcasting, by the endorser node, the new machine learning model to the blockchain network.

* * * * *